United States Patent [19]

McCaslin et al.

[11] Patent Number: 5,668,794

[45] Date of Patent: Sep. 16, 1997

[54] VARIABLE GAIN ECHO SUPPRESSOR

[75] Inventors: Shawn Robert McCaslin; Nariankadu Datatreya Hemkumar, both of Austin, Tex.

[73] Assignee: Crystal Semiconductor, Austin, Tex.

[21] Appl. No.: 552,558

[22] Filed: Nov. 3, 1995

Related U.S. Application Data

[63] Continuation-in-part of Ser. No. 536,986, Sep. 29, 1995, Pat. No. 5,631,900, and Ser. No. 536,054, Sep. 29, 1995.

[51] Int. Cl.$^6$ .................................................. H04B 3/20
[52] U.S. Cl. ................................................ 370/288; 379/409
[58] Field of Search ............................. 370/286, 288, 370/289; 379/406, 409, 410, 411

[56] References Cited

U.S. PATENT DOCUMENTS

| | | | |
|---|---|---|---|
| 4,368,360 | 1/1983 | Sato et al. | 379/411 |
| 4,546,216 | 10/1985 | Tegethoff | 379/410 |
| 4,591,670 | 5/1986 | Itoh | 379/409 |
| 4,609,788 | 9/1986 | Miller et al. | 379/406 |
| 4,628,156 | 12/1986 | Irvin | 379/410 |
| 4,644,108 | 2/1987 | Crouse et al. | 379/406 |
| 4,652,703 | 3/1987 | Lu et al. | 379/339 |
| 4,670,903 | 6/1987 | Araseki et al. | 379/411 |
| 4,679,230 | 7/1987 | Lassaux et al. | 379/411 |
| 4,748,665 | 5/1988 | Nicholas | 379/407 |
| 4,852,081 | 7/1989 | Bonnet et al. | 370/291 |
| 4,864,608 | 9/1989 | Miyamoto et al. | 379/409 |
| 4,878,163 | 10/1989 | Erving et al. | 370/288 |
| 4,885,755 | 12/1989 | Yoshida | 375/285 |
| 4,984,265 | 1/1991 | Connan et al. | 379/390 |
| 5,014,306 | 5/1991 | Rodgers et al. | 379/407 |
| 5,016,271 | 5/1991 | Ford | 379/410 |
| 5,022,074 | 6/1991 | Nicholas | 379/407 |
| 5,075,687 | 12/1991 | Chen et al. | 341/110 |
| 5,151,937 | 9/1992 | Chujo et al. | 379/410 |
| 5,157,653 | 10/1992 | Genter | 370/288 |
| 5,271,057 | 12/1993 | Addeo et al. | 379/202 |
| 5,274,606 | 12/1993 | Drumheller et al. | 367/82 |
| 5,283,784 | 2/1994 | Genter | 379/409 |
| 5,327,495 | 7/1994 | Shenoi et al. | 379/410 |
| 5,353,348 | 10/1994 | Sendyk et al. | 370/288 |
| 5,357,567 | 10/1994 | Barron et al. | 379/409 |
| 5,357,609 | 10/1994 | Sellers et al. | 395/200 |
| 5,381,475 | 1/1995 | Cavallo | 379/410 |
| 5,386,465 | 1/1995 | Addeo et al. | 379/202 |
| 5,414,763 | 5/1995 | Hirata | 379/201 |
| 5,434,912 | 7/1995 | Boyer et al. | 379/202 |
| 5,548,638 | 8/1996 | Yamaguchi et al. | 379/409 |

*Primary Examiner*—Benedict V. Safourek
*Attorney, Agent, or Firm*—Gregory M. Howison

[57] ABSTRACT

A variable gain echo suppressor is provided that utilizes two variable attenuators (410) and (412) that are disposed in the receive and transmit paths, respectively, of a communication system. An echo suppressor (414) receives the input from the far end and transmits the output from the near end and controls the two attenuators to set a variable gain therein. The echo suppressor utilizes a normalized power level which is normalized with respect to the background noise at the respective end and then takes the ratio of this normalized power and the normalized power at the opposite end to define an associated power ratio. This power ratio value is utilized to determine the attenuation for the associated end. When the power ratio is high, this indicates that a stronger signal is being received from that end and a small amount of attenuation is associated in the transmit path from that end. When they aye equal, this will result in both systems having approximately the same attenuation, a mid-level attenuation. This is provided through a look up table (450) for the far end and a look up table (452) for the near end. Additionally, the signal power is derived from a peak detection IIR filter (420) and (428) which has the characteristics thereof changed as a function of the power ratio. This is achieved by changing the value of the pole in the IIR filter.

20 Claims, 17 Drawing Sheets

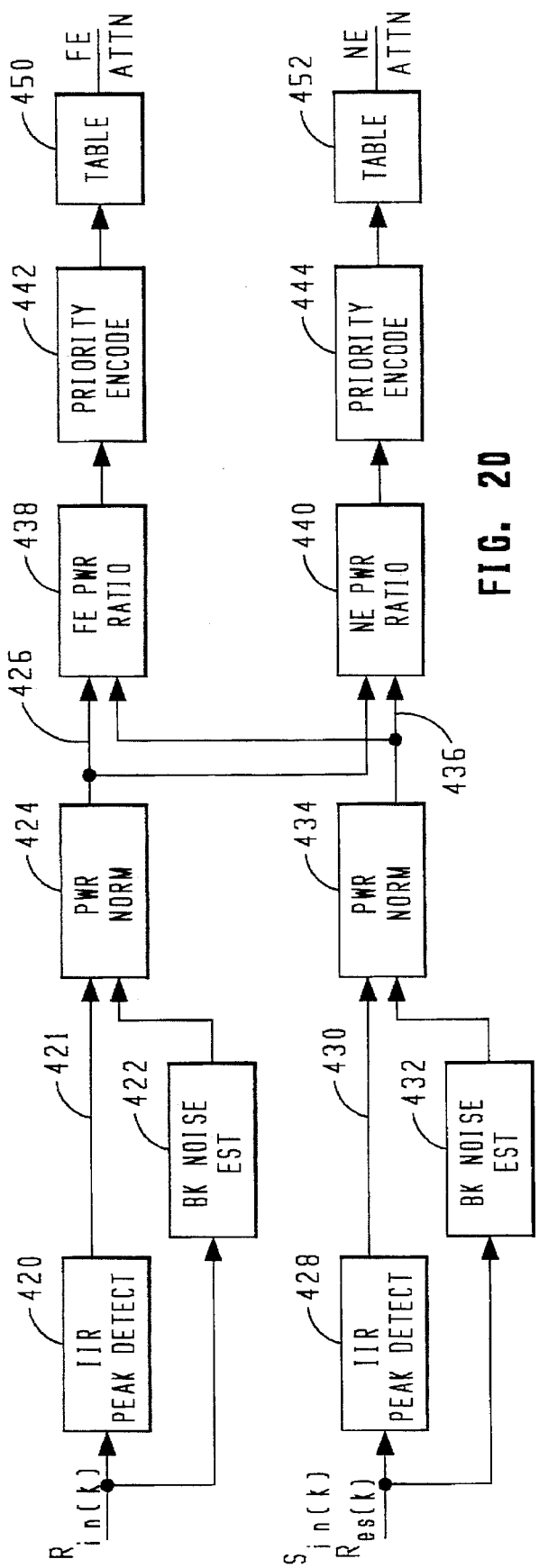
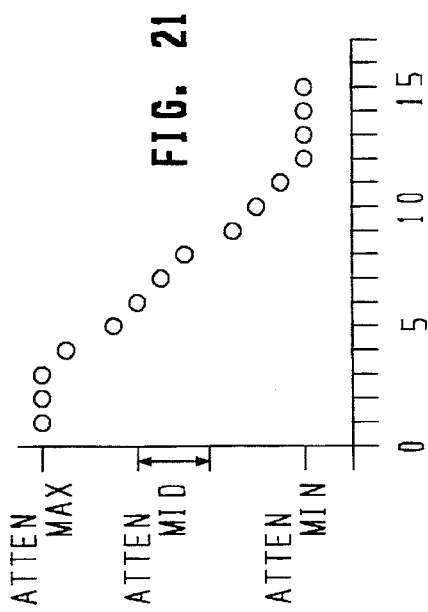
FIG. 20
FIG. 21

VARIABLE GAIN ECHO SUPPRESSOR

CROSS REFERENCE TO RELATED APPLICATION

This application is a Continuation-in-Part application of U.S. patent application Ser. No. 08/536,986 now U.S. Pat. No. 5,631,900, entitled "Double-Talk Detector for Echo Canceller", (Atty. Dkt. No. CRYS-23,465) and U.S. patent application Ser. No. 08/536,054, both filed Sep. 29, 1995, entitled "Half-Duplex Controller", (Atty. Dkt. No. CRYS-23,673).

TECHNICAL FIELD OF THE INVENTION

The present invention pertains in general to a full-duplex communication systems and, more particularly, to a method and apparatus for echo suppression.

BACKGROUND OF THE INVENTION

In telephone circuits, for reasons of line economics and easy replaceability, a two-wire configuration is generally adopted for a subscriber line that is connected to a subscriber's telephone set. The two-wire configuration constitutes a configuration wherein a single pair of wires is provided to carry signals in both directions. However, the line to which the subscriber line is connected utilizes a four-wire configuration which provides separate paths for each direction that is adopted.

In the conventional system, the subscriber lines differ in type and length. Therefore, each subscriber line has its own associated impedance and it is therefore difficult to match the hybrid coil perfectly. As a result, the hybrid coil not only passes the signal received from the distant party via the four-wire line to the local party via the subscriber line, but also acts as an echo path. This echo path allows the received signal to leak over to the transmitting side, where it becomes an echo signal that degrades communication quality. To cancel the echo signal, an echo canceller is typically deployed which is connected before the four-wire/two-wire conversion point.

A typical echo canceller may utilize data converters to convert between the analog and digital domains, such that a received analog signal can be converted to the digital domain, processed in the digital domain, and then converted back to the analog domain on both the transmit and receive paths. An adaptive filter in the digital domain is connected between the two paths, with the input of the adaptive filter connected to the received path and the output of the adaptive filter providing an input to a subtraction circuit for adjusting the transmitted value.

When the input signal is received from the distant party, it is sampled by an A/D converter to generate a discrete value at a sample time k, and thus convert it to a digital received signal. This digital received signal is converted by the D/A converter on the output of the receive path to an analog receive signal and then sent to the hybrid and, subsequently, the subscriber line to the local party. If the impedances are not matched, however, the analog receive signal follows an echo path and reaches the transmitting side as an echo signal. The echo signal is sampled by another A/D converter on the subscriber line side at a time k to generate a discrete value at time k, and is thus converted to a digital echo signal, which is fed to the subtractor.

The adaptive filter is operable to estimate the characteristics of the echo path and, from the estimated characteristics of the digital received signal, generate a simulated echo signal which is fed to the subtractor. The subtractor subtracts the simulated echo signal or echo signal from the digital echo signal and generates the difference as a residual signal. The adaptive filter is operable to cancel the echo signal so as to force the residual signal to converge as close as possible to zero.

The above description was directed toward "network echo", the other type being "acoustic echo", double talk presenting a problem to both types. In this type, the adaptive estimation function of the adaptive filter operates normally in the single-talk state, but in the double-talk state in which there is preferentially a transmitted signal from the local party, i.e., due to the party speaking, the estimation function of the adaptive filter is inaccurate, in that it may not provide the appropriate estimation function due to interference from the additional transmitted signal from the local party. Accordingly, echo cancellation devices which employ adaptive filters for estimating a room's response typically include a "double-talk" detection device which monitors the microphone signal to determine when a person is speaking into the microphone. One such detector, described in D. L. Duttweiler, "A Twelve Channel Digital Echo Canceller", IEEE Trans. On Comm., Volcom-26, No. 5, May 1978, declares double-talk when a sample of the microphone signal is greater than or equal to one-half the largest sample of the loudspeaker signal within the last N samples, where N is a constant equal to the maximum delay between the loudspeaker and the microphone. If someone is speaking into the microphone, the energy of the microphone signal is typically at least half that of the loudspeaker signal. Accordingly, the above described double talk detector properly concludes that someone is speaking into the microphone and disables the adaptive filter from adjusting its taps.

If the loudspeaker and microphone are far apart from each other, the microphone includes little or no acoustic feedback from the loudspeaker. Further, when someone is speaking softly into the microphone, the energy of the soft voice component of the microphone signal is not alone greater than half the energy of the loudspeaker signal. Accordingly, the above described double talk detector falsely concludes that no one is speaking into the microphone and therefore enables the adaptive filter to adjust its taps. The filter accordingly begins adjusting the taps in an effort to reduce the echo received at the microphone to zero. Thus, by falsely concluding that no one is speaking into the microphone, the device begins to cut off the voice of the person speaking into the microphone.

If the loudspeaker is placed close to the microphone, the energy of the microphone signal may exceed half the energy of the loudspeaker signal regardless of whether someone is speaking into the microphone. For example, if the room includes ambient background noise such as generated by a fan, the microphone picks up this sound and adds it to the substantial acoustic feedback caused by the close proximity of the microphone and loudspeaker. Accordingly, the energy of the microphone signal may exceed the half of the energy of the loudspeaker signal even when the loudspeaker is the only source of speech in the room. In this case, the above described double talk detector falsely concludes that someone is always speaking into the microphone and therefore permanently disables the adaptive filter from adjusting its taps.

In the above described operation, the system operated in a "full-duplex" mode. However, in some situations, the near-end and far-end have echo paths that result in an unstable operation, causing acoustic howling. One simple way of preventing a far-end user from hearing echos is to turn off the microphone at the near-end while the far-end user is talking, this referred to as half-duplex operation. In general, the prior half-duplex systems have involved a comparison of the signal power at the near-end either to a threshold, or to the signal power at the far end. This incurs some problems in the form of a dependence on relative power levels and a susceptibility to noise.

Another technique for curing acoustic howling, due to the loop becoming unstable due to the loop-gain being too high, is to utilize what is referred to as an "echo suppressor". This is facilitated by inserting one attenuator in the transmit path and another attenuator in the receive path. If either attenuator is on at any time, there is sufficient loop-gain reduction to prevent acoustic howling. The control logic for the attenuators would then be designed such that at least one attenuator is on at any particular time. In situations where an echo exists, the attenuator that is present in the path from the near-end microphone to the far-end is designed to have at least enough attenuation to prevent echo from being objectional to the far-end user. The control logic would then be designed so that this attenuator is always on whenever potentially objectional echo is present.

One disadvantage to current echo suppressors is that they do not adequately accommodate full-duplex communication. Only the far-end or the near-end can talk at any particular time; both cannot talk and be heard simultaneously. The result is that the user at one end cannot interrupt the other while the other is talking. This is a serious limitation that can make communication unnatural and unpleasant. However, if full-duplex communication is accommodated, some form of echo cancellation must be utilized. With echo cancellation, echo is removed from the signal received at the near-end without attenuating the speech originating at the near-end. A serious drawback to echo cancellation, however, is that it typically requires an adaptive filter, which is much more expensive to implement than the attenuation and control in an echo suppressor.

SUMMARY OF THE INVENTION

The present invention disclosed and claimed herein comprises a variable gain echo suppressor for use with a full-duplex communication system for communicating between a far end and a near end. The echo suppressor includes a first variable attenuator disposed between the far end and the near end and in the transmit path thereof and having more than two attenuation levels. A second variable attenuator is disposed between the near end and the far end in the transmit path thereof and also having more than two attenuation levels. Near end and far end power detectors are provided for detecting the near end and far end signal powers. A controller is provided for setting the attenuations for each of the first and second variable attenuators as a function of the detected near-end and far-end power levels. This allows for full-duplex communication, with the stronger detected power at the far end or near end associated with the lower attenuation in the associated first and second variable attenuators.

In another aspect of the present invention, each of the near end and far end power detectors utilizes a peak power estimate which calculates the power level by performing an averaging operation to average energy estimates that are generated over predetermined sample times to obtain the average thereof. The power detector utilizes an Infinite Impulse Response (IIR) filter with a low path response. This is a single-pole filter which is time-variant in nature. In the preferred embodiment, the single pole can have the value thereof changed as a function of the detected power level. For high attenuation values, the pole is selected for a slow response and, for low attenuations, the pole is selected for a fast response.

In yet another aspect of the present invention, the detected power is normalized to the associated background noise, this utilized for the setting operation of the attenuator values. The controller further includes a far end ratio device for determining the ratio of the far end normalized power signal to the near end normalized power signal, and a near end ratio device for determining the ratio for the near end normalized power signal to the far end normalized power signal. This provides far end and near end ratio values. These values are utilized to determine the attenuation value by the controller. The far end and near end ratios have a range of values corresponding to predetermined scaling factors. These predetermined scaling factors are stored in near end and far end tables. The controller is operable to access the associated scaling factor as a function of the determined far end and near end ratio to set the attenuation value of the first and second variable attenuators, respectively.

In yet another aspect of the present invention, a white noise generator is provided for generating white noise. First and second variable white noise attenuators are provided for receiving as an input the output of the white noise generator. First and second summation junctions are provided and associated with first and second variable attenuators. The first summation junction is operable to sum the output of the associated first variable attenuator with the output of the first variable white noise generator, and the second summation junction is operable to sum the output of the second variable attenuator with the second variable white noise attenuator. A controller is operable to set the attenuation values of the first and second variable white noise generators to reduce the attenuation by a value corresponding to an increase in the attenuation in the associated one of the first and second variable attenuators. Conversely, the first and second white noise attenuators have the attenuation thereof decreased by an amount corresponding to an increase in attenuation in the associated first and second variable attenuators.

BRIEF DESCRIPTION OF THE DRAWINGS

For a more complete understanding of the present invention and the advantages thereof, reference is now made to the following description taken in conjunction with the accompanying Drawings in which:

FIG. 20 illustrates a block diagram illustrating the far end and near end portions of the echo suppressor;

FIG. 21 illustrates a plot of the attenuation values as a function of the indices;

DETAILED DESCRIPTION OF THE INVENTION

Figure 1:
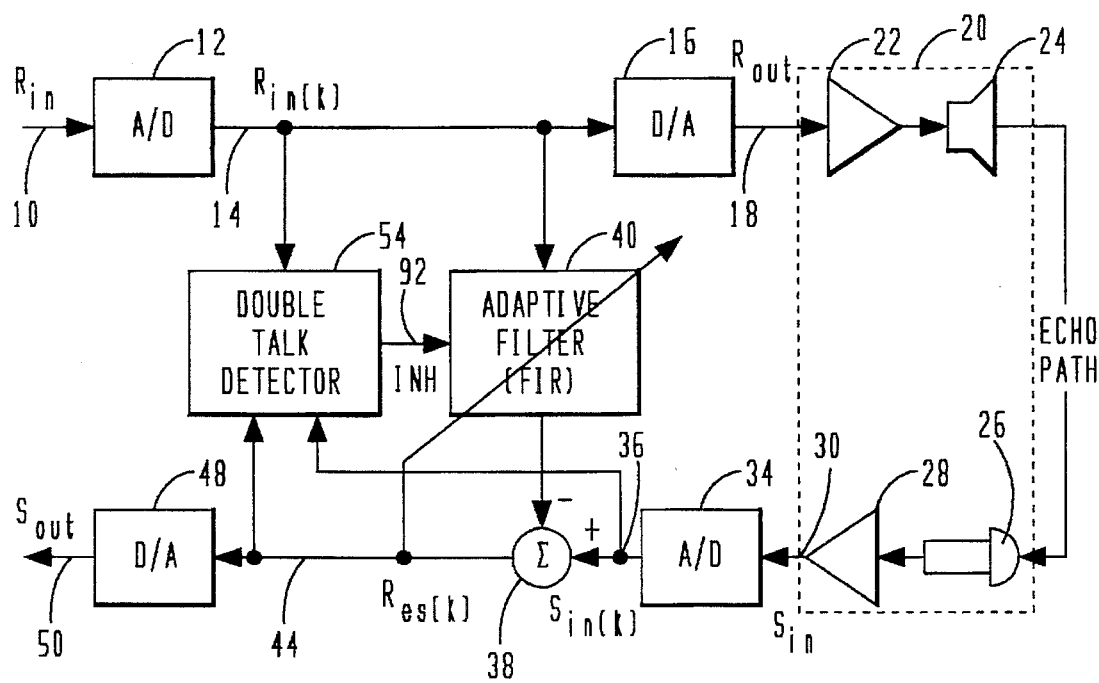
FIG. 1 illustrates an overall diagram of a double-talk detection system.

Referring now to FIG. 1, there is illustrated a block diagram of a double-talk detector from a general overview. The far-end audio is received from a far-end source through a receive line 10 which is input to an A/D converter 12 to provide on the output thereof a sampled receive value $R_{in}(k)$ on a line 14. This is input to a D/A converter 16 to convert the digital value back to an analog value $R_{out}$. This is input to a near-end device 20. The near-end device is comprised of a receive path wherein the line 18 is input through a buffer 22, the output of which drives a speaker 24. A transmit path is provided via a microphone 26 and a buffer/driver 28, which drives an output line 30 to provide an output signal $S_{in}$.

The transmit path on the output $S_{in}$ is input to an A/D converter 34, which provides a sampled digital output $S_{in}(k)$ on a line 36. This is input to the positive input of a subtraction circuit 38. An adaptive filter 40 is provided, which has the input thereof connected to $R_{in}(k)$ on line 14 and provides on the output thereof a filtered output signal which is input to the negative input of the subtraction circuit 38. This provides the difference of the sampled signal $S_{in}(k)$ on the line 36 and the signal output by the adaptive filter 40. This is output on a line 44 as a residual signal Res(k), this being a sampled signal. This line 44 and the signal Res(k) are input to a D/A converter 48 to provide the output signal to the far end.

The adaptive filter 40 is operable to provide the basic echo cancelling operation, which is well-known in the art. As illustrated in FIG. 1, there is an echo path between the speaker 24 and microphone 26. As such, a portion of the $R_{in}$ signal will be received and fed back to the transmit path resulting in a portion of the $R_{in}$ signal being impressed upon $S_{out}$. The adaptive filter 40 is operable to develop and periodically update an adjustable estimated impulse response of the near-end path and generate, in accordance with the estimated impulse response and a received path signal, an estimate of the echo signal occurring on the transmit-in path in response to the receive path signal. This echo estimate signal is algebraically combined with the transmit-in signal $S_{in}(k)$ with the subtraction circuit 38 to yield the transmit-out path signal Res(k) on line 44. The adaptive filter 40 also received as an input the Res(k) signal for use in the adaptive operation.

In normal operation with the echo path stationary, the echo canceller will estimate the reflection signal, the quality of this estimation determining the degree of echo reduction. The measure of the quality of the estimate is referred to as the echo return-loss enhancement (ERLE). This is defined as the reduction in echo power provided by the echo canceller; equivalently, it is the ratio of the estimated power in the signal at the output of the echo canceller to the estimated echo-power, as follows:

$$ERLE = 10\log \frac{E[S_{in}^2]}{E[R_{es}^2]} \qquad (1)$$

Wherein, E ≙ Expectation operator

This echo reduction is also important for reducing loop gain. The far end and the near end are linked by an acoustic loop. If the loop gain in this loop is too high, the loop will become unstable and will produce acoustic howling. If the system at the far end is a full-duplex speaker phone, that speaker phone will be able to operate with higher output and input gain, if it can rely on loop-gain reduction from the near-end echo canceller.

The echo canceller produces the estimate by filtering the signal from the far end with the adaptive filter 40, which is operable to effectively model the echo path and provide a prediction of the echo signal. In modern echo cancellers, this filter is typically trained by the LMS (Least-Mean Squared) algorithm. In such systems, the signal from the far end, i.e., the "training signal" is used to "illuminate" the echo path; that is, the LMS algorithm can estimate the path's response by observing the path's effect on the far-end signal, once it has been received at the near-end microphone 26.

Noise at the near end can interfere with an echo canceller's ability to estimate the path response. For example, near-end stationary noise sets an upper bound on the ERLE that an echo canceller can provide given a particular adaptive filter update gain. Stationary near-end noise can therefore limit the loop-gain reduction provided by the echo canceller. If the near-end noise level is too high, the echo canceller may not be able to provide sufficient loop-gain reduction to prevent instability. However, the uncancelled residual echo may still be largely masked by the near-end noise from the far-end listener's perspective. As a result, stationary noise may undesirably limit the ERLE, but it may not cause the echo to rise to objectionable levels from the far-end listener's perspective.

By comparison, non-stationary noise presents more difficulties. For example, if the background noise suddenly attenuates, residual echo that was being masked by the noise will leak through, making echo clearly perceptible from the far-end listener's perspective until the echo canceller can reconverge to accommodate the new noise floor. Clearly, fast convergence speed is an advantage in this situation.

Another type of non-stationary "noise" is near-end speech. Since near-end speech typically does not occur at the same time as far-end speech, near-end speech does not reliably mask echo. Also, if an echo canceller is allowed to adapt while near-end speech is present, the ERLE when near-end speech is not present will be significantly degraded. Therefore, it is important to block updates while near-end speech is present.

In order to provide this update blocking operation, a double-talk detector 54 is provided. The double-talk detector 54 is operable to control the time that coefficient updates are allowed. The double-talk detector 54 receives as inputs the $R_{in}(k)$ signal on line 14, the $S_{in}(k)$ signal on line 36 and the Res(k) signal on line 44.

The figures of merit for a double-talk detector are:

1) Reliability of blocking updates when near-end speech is present. Erroneously updating the adaptive filter while near-end speech (or other non-stationary noise source) is present can seriously degrade canceller performance.

2) Reliability of allowing updates when near-end speech is not present. Erroneously blocking updates while near-end speech is not present will unnecessarily limit performance, and can therefore seriously degrade canceller performance.

3) Cost. Echo-canceller applications are typically cost sensitive, so minimizing cost is important.

In the above description, the echo is an acoustic echo. However, there are other types of echoes; for example, echo, which also interferes with communications, is generated in telephony networks. In this case, the network (classically called "network echo") is electrical, this echo being generated when a signal is reflected off of an impedance discontinuity at a two-wire to four-wire hybrid. An echo canceller can be used to cancel these network echoes. The figures of merit described above for an acoustic echo canceller, as well as the basic operation, are the same for a network canceller, such that the apparatus described herein would apply in both acoustic and in network-echo applications.

Figure 2:
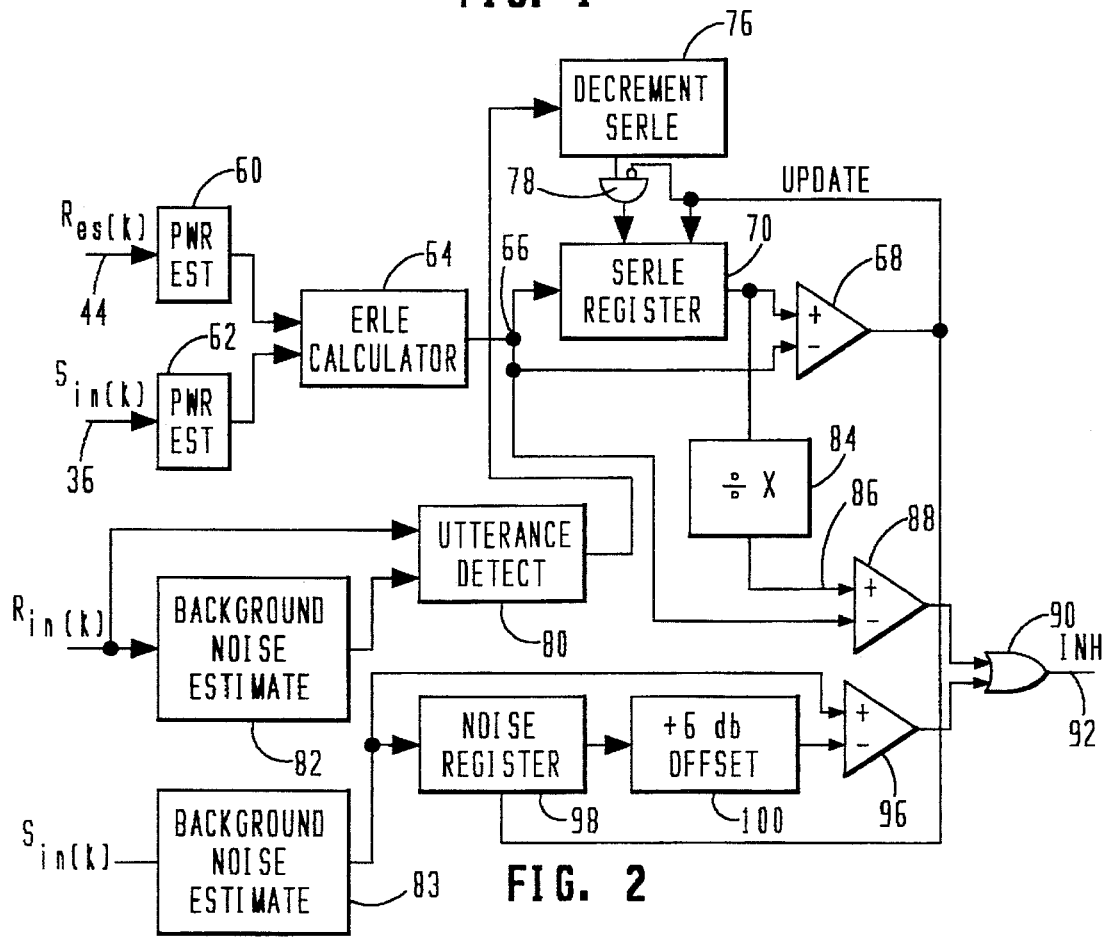
FIG. 2 illustrates a detailed block diagram of the double-talk detector.

Referring now to FIG. 2, there is illustrated a detailed block diagram of the double talk detector. Both the Res(k) signal from line 44 and the $S_{in}(k)$ signal from line 36 are input to respective power estimation circuits 60 and 62. The power estimation circuits 60 and 62 are peak-detecting power estimators which utilize a single-pole infinite impulse response (IIR) filter. In the preferred embodiment, the power estimator is a "leaky" peak estimating power estimator which is defined by the following equations:

$$P(k) = aP(k-1) + (1-a)[X(k)]^2 \quad (2)$$

$$\text{if } [X(k)]^2 > P(k), P(k) = [X(k)]^2 \quad (3)$$

Wherein, k ≙ time index

"a" ≙ iir pole constant

For far-end input power, $R_{in}$ would be substituted for the value of X and for near-end input power, $S_{in}$ would be substituted for X. In this estimator, Equation 2 is a one-pole IIR filter, though it could be implemented as a multi-pole IIR filter, or as an FIR filter. Equation 3 is a peak detector. Instead of utilizing a squaring function on the input, both Equations 2 and 3 could use an absolute value (|X(k)|) to reduce complexity. Note that the use of equations 2 and 3 deviates from the formal, strict definition in equation 1.

The output of the power estimators 60 and 62 are input to an ERLE calculator 64. The ERLE calculator 64 calculates the ERLE in accordance with Equation 1 and provides the output on the node 66. The output value is input directly to the negative input of a comparator 68 and also to the input of a register 70. The register 70 is a register for storing the best value for ERLE, the "SERLE", which best value would be the largest value. The output of the register 70 is connected to the positive input of the comparator 68, such that whenever the SERLE value in register 70 is higher than the value output by the ERLE calculator 64, an update would be provided and the new value stored in the register 70 as the new SERLE, this update input on the register 70 connected to the output of the comparator 68.

The ERLE operation of the present apparatus utilizes a discriminating operation wherein the SERLE value stored in the SERLE register 70 is decremented upon the detection of some type of "utterance" at the far end. A decrement device 76 is provided, which causes the decrement operation. The output of the decrement device 76 is input to one input of an AND gate 78, the output of which drives a decrement input on the register 70. However, the gate 78 is blocked whenever an update signal is generated, this effected by connecting the output of the comparator 68 to the negative input of the AND gate 78. A far-end utterance detector 80 is provided which has one input thereof connected to the line 14 to receive the $R_{in}(k)$ signal. Another input is connected to the output of a background noise estimator 82, which estimates background noise from the $R_{in}(k)$ signal. Although not shown, a near-end utterance detector is provided to receive the $S_{in}(k)$ signal and process it similar to the operation described above with respect to $R_{in}(k)$.

The output of the register 70 is divided by a predetermined percentage, as represented by a block 84, to provide a fraction on an output 86. The fraction of the SERLE on line 86 is input to the negative input of a comparator 88. The positive input thereof is connected to the output of the ERLE calculator 64 such that the comparator 88 makes a decision utilizing as a threshold input a fraction of the SERLE. The output of the comparator 88 is input to one input of an OR gate 90, which provides the inhibit signal INH to the adaptive filter 40 on a line 92. Therefore, updates are blocked or inhibited whenever the current ERLE is less than the SERLE stored in register 70 by a predetermined fraction of that SERLE. This is compared to prior art systems that utilize a fixed difference, such as 6 dB above the SERLE. In the preferred embodiment, the fraction provided by the block 84 is fifty percent (in dB). The advantage to utilizing a fraction instead of a fixed value is that small changes in the echo path or training-signal characteristics can be accommodated without compromising convergence speed.

To accommodate changes in the echo path, the SERLE value stored in register 70 (SERLE) is decreased by a fixed amount periodically. If the current ERLE on node 66 decreases substantially due to a path change, updates may be blocked. By decreasing the SERLE value periodically, eventually updates will be reenabled, even for radical path changes. As a result, a supplementary path change detector may not be needed for handling mild path changes. In systems in which radical path changes are expected, a delay between the path change and complete recovery may be too long, in which case, a supplementary path-change detector would be required. This operation is provided by the decrement block 76.

In the preferred embodiment, the SERLE value (in dB) is decremented at the onset of each utterance from the far-end. An utterance at the far end is defined by a transient increase in far-end signal power. A disadvantage to gradually decreasing the SERLE value stored in register 70 is that updates may eventually be enabled during times when the near-end noise floor is elevated. This is an important issue, because typically the ERLE in practical applications is limited by the near-end noise level. If the near-end noise level rises and an echo canceller is allowed to update, the ERLE is likely to decrease. Fortunately, the elevated noise will likely mask much of the resulting higher echo from the far-end's perspective. Unfortunately, the loop-gain reduction being provided by the echo canceller will also decrease. If the far end is relying on the near-end echo canceller for a loop-gain reduction, the loop may go unstable if the SERLE value is reduced too much in register 70.

Prior art systems for situations where a path change does not occur provide no benefit until the difference between the best ERLE (SERLE) and the current ERLE is more than a fixed value, such as 6 dB. This provides a benefit, since it allows the SERLE to be maintained (as long as the path does not change), even if the near-end background level rises. The problem is, however, that the prior art is likely to clear the values stored in register 70 when minor path changes occur. In applications where minor path changes are likely to occur, the SERLE value will be cleared frequently, even in high-noise applications, thus effectively eliminating the advantage provided thereby.

If, as provided by the decrement box 76, the value of the SERLE is gradually decreased, and the near-end background noise level increases, the actual or current ERLE will also decrease. This can be a disadvantage, since the loop-gain reduction provided by the echo canceller will decrease. To prevent unnecessary degradation to the ERLE due to rises in the near-end noise floor, it is necessary to block updates when the near-end background noise level rises significantly. In particular, the background near-end noise level (calculated the same way as the far-end background noise-power) is saved whenever the SERLE value is replaced with the current ERLE value. Then, updates are blocked whenever the current near-end noise floor is higher (in the preferred embodiment, by 6.0 dB) than the saved background noise level.

This feature is provided by a comparator 96 which has the positive input thereof connected to the output of a near-end background noise estimator 83. The background noise is compared with a stored value in a noise register 98 received from the background noise estimator which is then offset to a higher level by 6 dB with an offset circuit 100. The offset value in the noise register 98 is input to the negative input of the comparator 96. Whenever the background noise output by the background noise estimator 82 rises above the previously stored estimated value by a value of 6 dB, the output of the comparator 96 goes high, this being input to the other input of the OR gate 90, thus providing an inhibit signal under this condition. The noise value is stored in register 98 whenever the contents of register 70 are updated.

Figure 3:
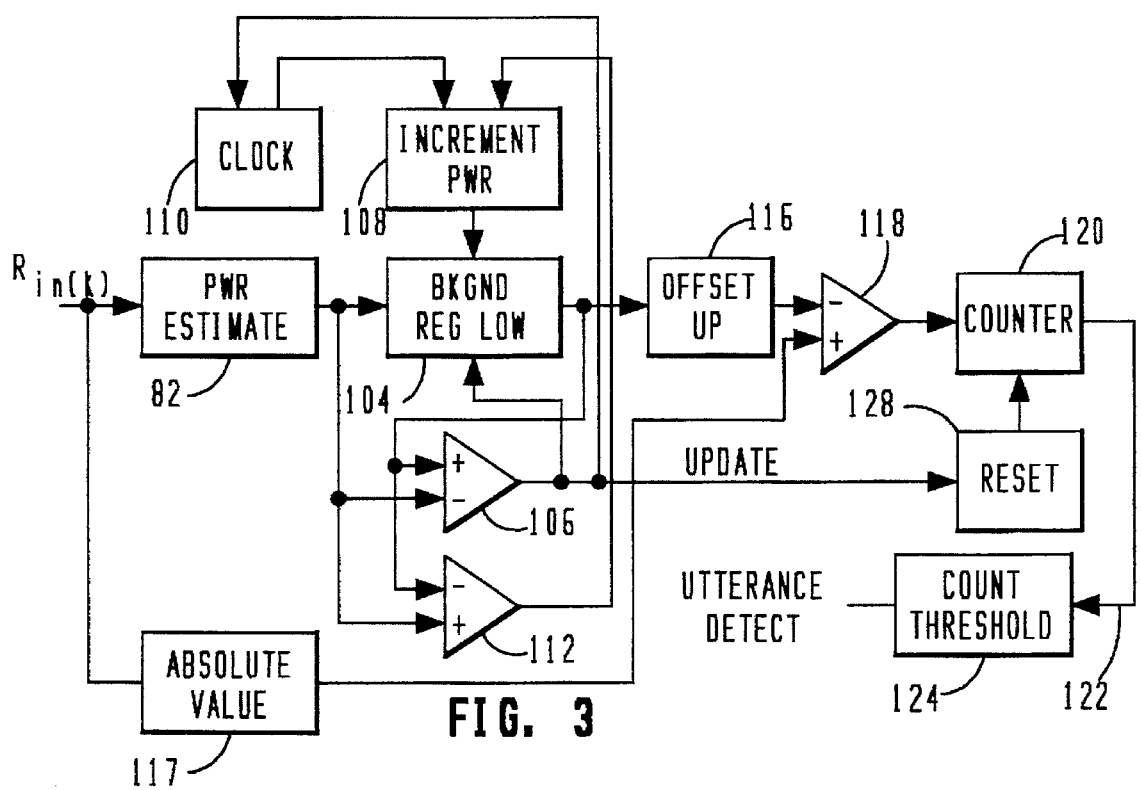
FIG. 3 illustrates a detailed block diagram of the portion of the double-talk detector utilized for detecting utterances.

Referring now to FIG. 3, there is illustrated a block diagram of the utterance detector 80 and the operation thereof. It should be understood that this discussion, although directed toward far-end utterance detection, applies equally to near-end utterance detection. If the far-end power is higher than the background noise-power for a pre-specified period of time, the background noise-power estimate is increased slightly (to compensate for increases in the background noise power level), preferably by a fixed amount in dB. In the preferred embodiment, the increase is 3 dB every 0.75 seconds.

Instead of increasing the background noise of the power estimate only after a pre-specified period of time, it is possible to increase the background noise power by a small amount each sample time. However, the former implementation is preferable, since the increment is a fixed amount in dB, and a few large increments in dB are easier to implement than many small increments.

At each sample time, the absolute value of the raw input from each end is compared to its respective background noise-power estimator. When rising excursions of the raw input in which the raw input crosses the background noise power level, scaled up by some pre-specified factor, an "utterance-detector" counter for that end is incremented. Whenever the background power estimate is lowered, the utterance-detector counter for that end is cleared. If the utterance-detector counter exceeds a particular threshold (in the preferred embodiment), an utterance is declared detected.

Referring further to FIG. 3, the power estimate is provided by the block 82 which receives the input $R_{in}(k)$. The output of block 82 is input to a register 104 which is operable to store the lowest value for the background power. This register is updated via a comparator 106, the negative input thereof connected to the output of the power estimator 82. The positive input thereof is connected to the output of the register 104 to provide a threshold value. Therefore, whenever the output of power estimator 82 falls below the stored value, background power is updated and a clock 110 is restarted. This therefore provides the lowest background power value. A scaling block 108 is provided for increasing the value stored in the background register 104 by the predetermined value of 3 dB whenever a predetermined time period provided by the clock 110 expires. This is provided with a comparator 112, having the positive input thereof connected to the power estimator output 82 and the negative input thereof connected to the output of the register 104.

The output of the register 104 is connected to an offset register 116, the output thereof providing an upwardly offset value by a factor of 6 dB. This is input to a negative input of a comparator 118, the positive input connected to the raw input signal $R_{in}(k)$ through absolute value block 117. The output of the comparator 118 goes high whenever the raw input rises above the offset background power value. This increments a counter 120 to provide an output count value on a line 122. Whenever the count value is above a threshold count value, provided by a block 124, an utterance detect signal is provided. The threshold, as described above, is a count value of eight. The counter 120 is reset whenever an update signal to the register 104 is provided on the output of the comparator 106, this provided by a reset circuit 128, this also input to clock 110 as a reset signal.

Figure 4:
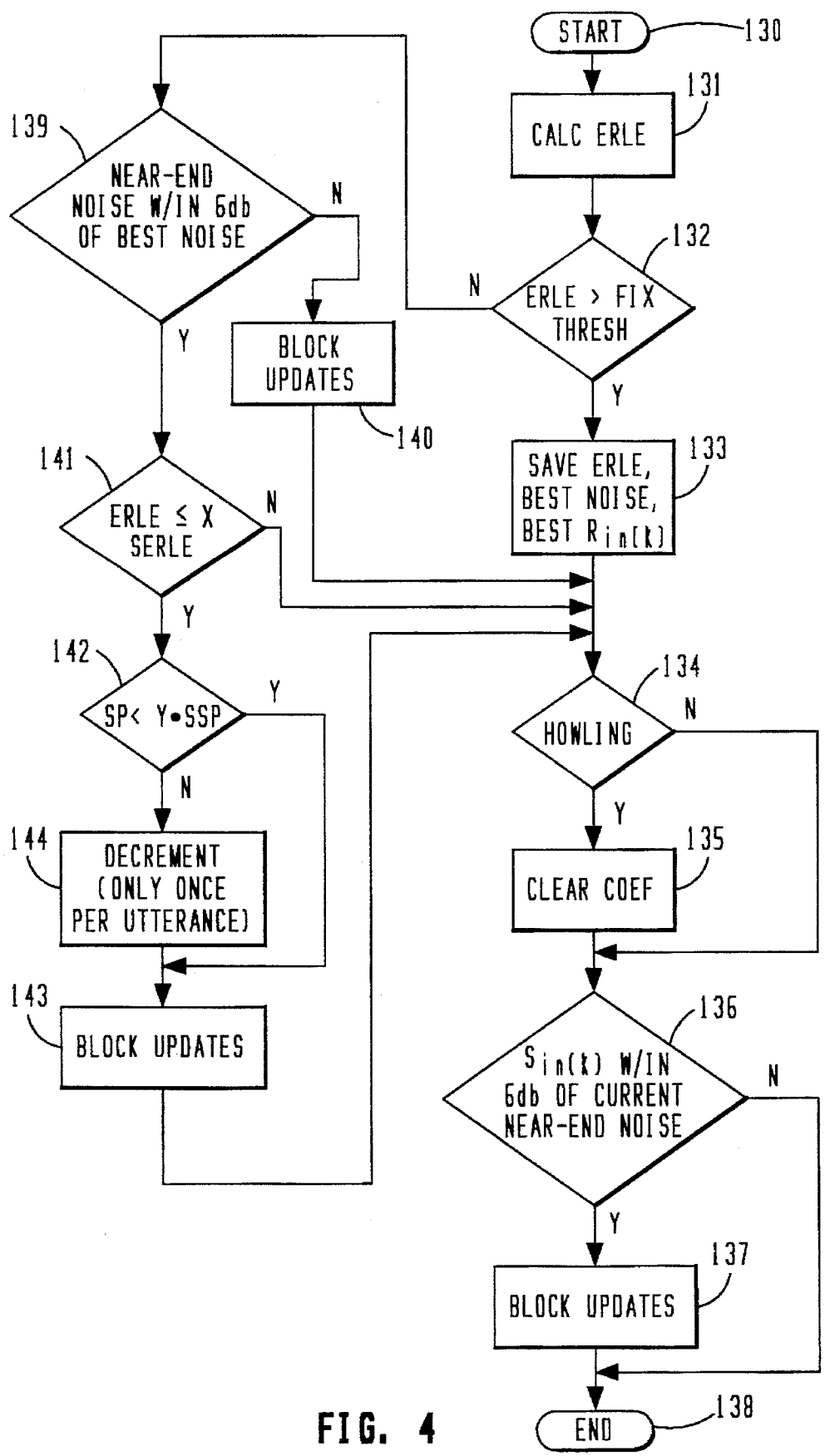
FIG. 4 illustrates a flowchart for the overall operation of the double-talk detector.

Referring now to FIG. 4, there is illustrated a flowchart depicting the overall operation of the echo canceller of the present apparatus. The program is initiated at a Start block 130 and then proceeds to a function block 131 to calculate the current ERLE value. The program then proceeds to a decision block 132 wherein the determination is made as to whether the value of the current ERLE is greater than a fixed threshold value, this fixed threshold value typically being a value of "10". However, it should be understood that this value could be something different. If it is determined that the value of ERLE exceeds the value of "10", the program will proceed along the "Y" path to a function block 133. The function block 133 is the operation wherein the current ERLE is saved as the SERLE value in the register 70. Additionally, during this save operation, the value of SERLE is limited or clamped to a value of "10". As such, the saved SERLE value in the register 70 can therefore not go to a value above "10". Although in the present embodiment the fixed value which ERLE is compared with in decision block 132 has a value of "10", this value could vary. If this value were lower, a lower value of ERLE could be stored in the register 70 as the SERLE value. However, if the value of ERLE was "13", then only the value of "10" would be stored as the SERLE value in register 70. Additionally, the near-end noise is measured and, if the SERLE value is updated, then this current noise level is saved as the "best" noise. The signal power of $R_{in}(k)$ is measured and compared with a saved signal power value. If this signal power exceeds the previously saved signal power, then this best $R_{in}(k)$ value is saved.

After the function block 133 operations are performed, the program will flow to a decision block 134 to determine if a howling detection has been made. If so, the program flows along a "Y" path to a function block 135 to clear the coefficients in the adaptive filter 40. If no howling has been detected, the program will flow along the "N" path to the input of a decision block 136, the program also flowing from function block 135 to decision block 136. Decision block 136 determines whether the transmitted power at the near-end, $S_{in}(k)$, is within 6 dB of the current near-end noise. If so, the program flows along a "Y" path to a function block 137 wherein updates to the adaptive filter 40 are blocked. The program then flows to an End block 138. If the value of the $S_{in}(k)$ is not within 6 dB of the current near-end noise, i.e., it is more than 6 dB higher than the current near-end noise, then the program will flow along the "N" path to the End block 138.

If the decision block 132 determined that the current value of ERLE was not greater than the fixed threshold, the program will flow along the "N" path from decision block 132 to a decision block 139. Decision block 139 determines whether the near-end noise is within 6 dB of the best noise value. If not, this indicates that the current near-end noise is more than 6 dB greater than the stored best noise value stored. The program would then flow along the "N" path to a function block 140 to block updates to the adaptive filter 40 and then to the input of the decision block 134. However, if the decision block 139 determined that the near-end noise was within 6 dB of the best noise, the program would flow along the "Y" path to a decision block 141. Decision block 141 determines if the current value of ERLE is less than or equal to a fraction "X" of the SERLE value stored in register 70. In the preferred embodiment, this fraction is 0.5. Therefore, if the ERLE is equal to or less than 50% of the stored SERLE value in register 70, then the program will flow along the "Y" path to a decision block 142. However, if it is determined that the ERLE value is greater than 50% of the SERLE value stored in register 70, the program will flow along the "N" path to the input of decision block 134.

The decision block 142 determines whether the signal power "SP" of $R_{in}(k)$ is less than a fraction "Y" of a stored signal power "SSP" that represents the best far-end input signal power. The fraction "Y" is such that the value to which it is compared is 24 dB below the SSP value. If it is determined that the stored signal power "SSP" multiplied by the scaling factor "Y" is greater than the signal power "SP", the program will flow along the "Y" path to a function block 143 wherein updates to the adaptive filter 40 are blocked. However, if it is determined that the signal power is greater than the scaled down "SSP" value, the program will flow along the "N" path wherein a decrement operation will be performed, as indicated by a function block 144. However, the decrement operation is allowed to only operate once per every utterance detection. Since an utterance is defined as a transient in the signal power at the far-end, then each transient in the far-end signal power will result in a decrement operation. The program will flow from the function block 143 back to the input of decision block 134.

Figure 5:
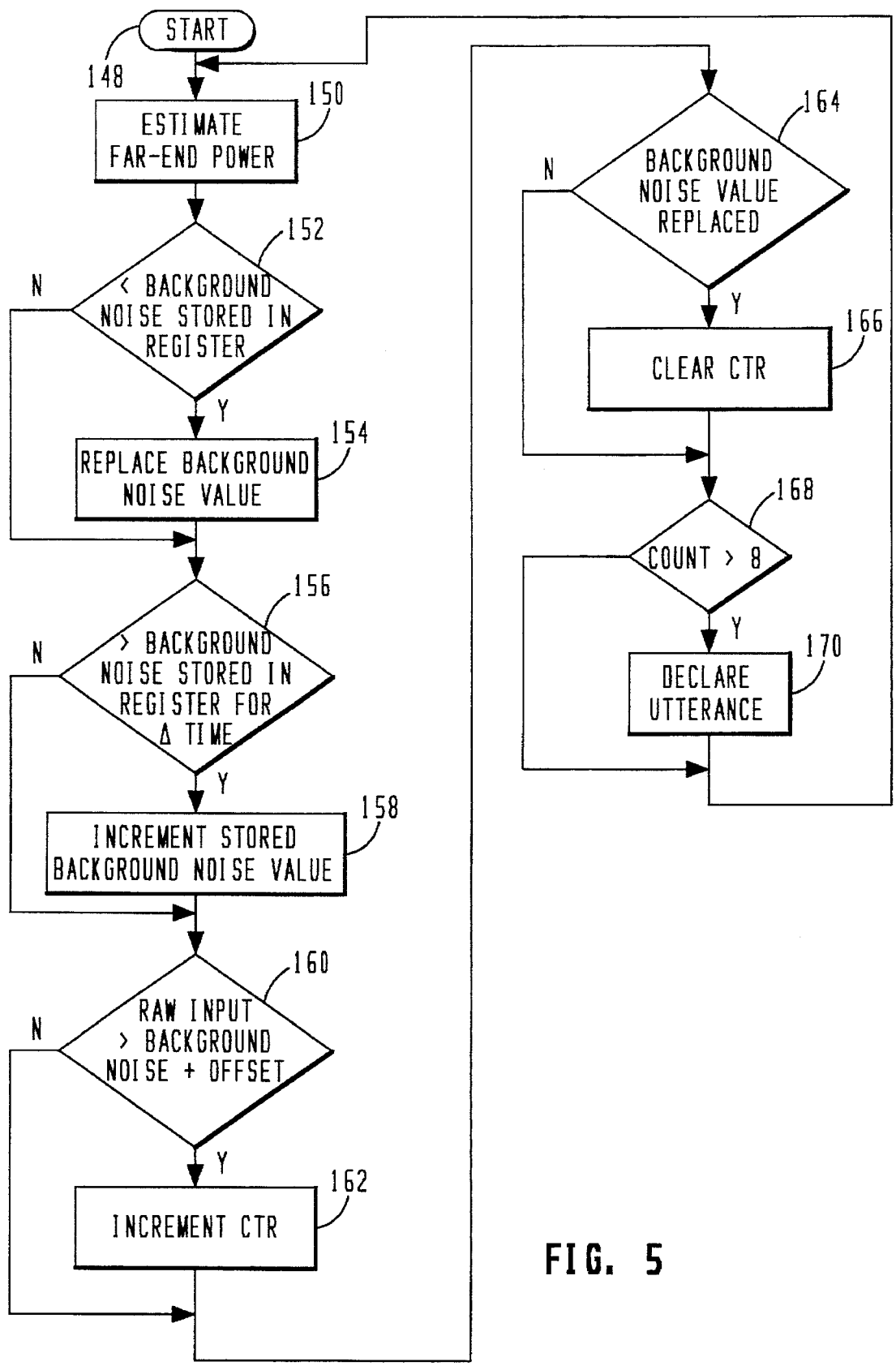
FIG. 5 illustrates a flowchart for the utterance detection operation.

Referring now to FIG. 5, there is illustrated a flowchart depicting the utterance detection operation for the far-end operation, it being understood that this applies to a near-end utterance detection. The program is initiated at a start block 148 and then proceeds to a function block 150 to estimate the far-end power (near-end power for detection of a near-end utterance). The program flows to a function block 152 to determine if the far-end power is less than the far-end background noise stored in the register 104. If so, the program flows along a "Y" path to a function block 154 to replace the far-end background noise value. If negative, the program will flow along the "N" path to the input of a decision block 156, this also being the path from block 154.

The decision block 156 determines whether the far-end background noise stored in register 104 is present for a predetermined mount of time. If so, the program flows along a "Y" path to a function block 158 to increment the stored background noise value in register 104. If not, the program flows along an "N" path to the input of a decision block 160, this also being the path from the block 158.

The decision block 160 determines if the raw input $R_{in}(k)$ is greater than the far-end background noise plus an offset ($S_{in}(k)$ for near-end utterance detection and the stored near-end background noise). If so, the program flows along a "Y" path to a function block 162 to increment the counter 120. If not, the program flows along an "N" path to the input of the decision block 164, this also being the path from the function block 162.

The decision block 164 determines whether the far-end background noise value has been replaced, i.e., whether it has been updated. If so, the program flows along the "Y" path to a function block 166 to clear the counter 120 and then to the input of a decision block 168. If the far-end background noise value were determined as not having been replaced at decision block 164, the program would flow along the "N" path to the function block 168. The function block 168 determines whether the count value in counter 120 is greater than 8, and if so, the program will flow to a function block 170 to declare a far-end utterance. If not, it will flow along an "N" path back to the input of function block 150, this also being the path from the block 170.

Figure 6:
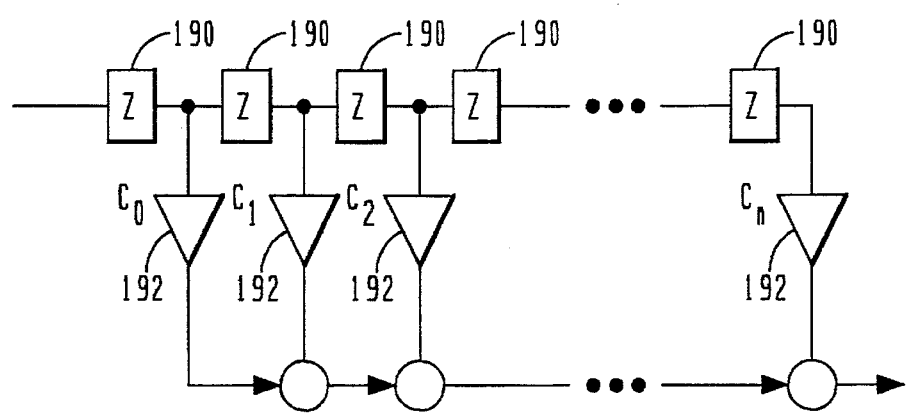
FIG. 6 illustrates a block diagram of a FIR filter.

Referring now to FIG. 6, there is illustrated a general block diagram of a Finite Impulse Response (FIR) filter that is utilized to realize the adaptive filter 40. The typical FIR filter is realized with a delay chain comprised of a plurality of delay blocks 190 which are arranged in a serial manner. In the present embodiment, there are 512 taps with 512 delay blocks, with a tap existing between each of the adjacent delay blocks and one at the output of the 512th delay block 190. Each of the taps is input through a coefficient block 192 in order to multiply the value at that tap by the associated coefficient value for each of the coefficient blocks 192, these coefficients being $C_0, C_1, C_2, \ldots, C_{511}$. The outputs of the coefficient blocks 192 are then input into an accumulation section to provide an output value. This is a conventional technique. In order to perform the adaptive function of the adaptive filter 40, it is necessary to adjust the coefficient values $C_i$. The update operation is one that utilizes some type of iterative procedure such, as described above, a Least Means Squared (LMS) algorithm. Of course, it should be understood that other types of algorithms can be utilized. In any of the algorithms that are utilized to generate the appropriate impulse response for storage in the FIR filter, the weights will be changed by calculating a delta value for the change, and then applying this change. During this calculation process, this delta value can be examined to determine how the system is performing.

In order to accommodate a "radical path change" situation, a Variable Step Size algorithm is utilized, which is disclosed in U.S. Pat. No. 4,894,820 issued Jan. 16, 1990, which is incorporated herein by reference. In U.S. Pat. No.

4,894,820, this algorithm is utilized to control step size, whereas the present apparatus utilizes the algorithm to detect path changes. In the use of the Variable Step size algorithm in the present apparatus, for any particular tap in the adaptive filter, the update term for that tap will tend to have the same sign for each sample time during convergence of the filter. Once the filter has completed convergence, the sign of the update term will likely vary. The average value of the sign of this term will be zero. If the absolute value of the average of the sign of the update term exceeds a particular threshold, convergence is in progress. If it is below the threshold, convergence is declared complete. This algorithm facilitates a reduction in update gain once the adaptive filter has achieved a particular level of convergence.

In the preferred embodiment of the present apparatus, the sign of the update term for a particular tap is utilized if the path change has occurred for that tap. The equations for the update terms are calculated as follows:

$$C_{ik} = C_{i(k-1)} + \Delta_i \quad (4)$$

$$C_{ik} = C_{i(k-1)} + \frac{\beta e x_i}{\sigma_x^2} \quad (5)$$

where:

$=scaling factor
e=$S_{in}(k)$—adaptive filter output convolution
$x_i$=delay line In the preferred embodiment, the absolute value of the average of the sign of the update term is utilized wherein it is summed over a particular period of time to indicate if a path change has occurred. If its value exceeds a particular threshold at the end of the measurement period (10 ms in the preferred embodiment), a path change is declared for its associated filter tap. Note that, instead of summing over a measurement period, the absolute value of the average of the sign of the update term could be passed to a low pass filter, either an Infinite Impulse Response (IIR) or FIR filter.

The value of the SERLE stored in the register 70 is decremented whenever a path change is declared. Therefore, it is not necessary to detect small changes in the echo path—only radical path-change detection is needed. By assuming that radical path changes always affect at least the filter tap that has the largest magnitude, one can design the path-change detector to operate on only a single tap—the largest tap—at any particular time.

To further simplify the operation, the largest tap is not necessarily utilized. Instead, a "block-scale normalizer" can be utilized. This is a conventional device that is well known in the art. In this application, it would operate by searching through all filter taps to find those taps whose absolute magnitude has the bit set that is the most significant (note, however, that no normalization would be performed in this step). This group of taps will be the largest, over a potential range of 6 dB. Of these, the last tap would be chosen (the tap that is located at the largest delay). The sign bit of the update term for this tap is then connected to the input of an "up/down" counter. At each sample time, this value is incremented or decremented, depending on the sign of the update term. At the end of the measurement period, the magnitude of the value in the "up/down" counter is compared to an absolute threshold. If the magnitude exceeds the threshold, a path change is declared. If a path change is detected, the value of the SERLE is cleared, the "best" near-end background power estimate to the maximum-positive value is saved, the coefficients of the adaptive filter are cleared, and the operation is changed to half-duplex operation.

The reasons that the radical path change is treated in this manner is that, if a radical path change occurs, the current ERLE will likely become negative until reconvergence occurs. By clearing the coefficients when the radical path change occurs, less echo will be transmitted back to the far end, and reconvergence will therefore be faster than decrementing SERLE. If the far end is relying on the near-end echo canceller for loop-gain reduction, the loop may go unstable. To prevent instability, a half-duplex algorithm is enabled when a radical path change is detected, and is disabled once the SERLE has reached a pre-determined threshold. Although the exact half-duplex algorithm utilized is not important, one example would be that described in the Motorola Telecommunications Databook for the Motorola MC34118 Voice-Switched Speaker Phone Circuit. As a result, the saved best near-end noise is reset to the maximum-positive value, effectively restarting that parameter. The SERLE needs to be cleared to allow the echo canceller to be updated, since otherwise, the double-talk detector is likely to completely block updates. The fact that half-duplex operation is enabled at this point helps, since double-talk, which could interfere with coefficient updates, should be blocked by the half-duplex operation.

Figure 7:
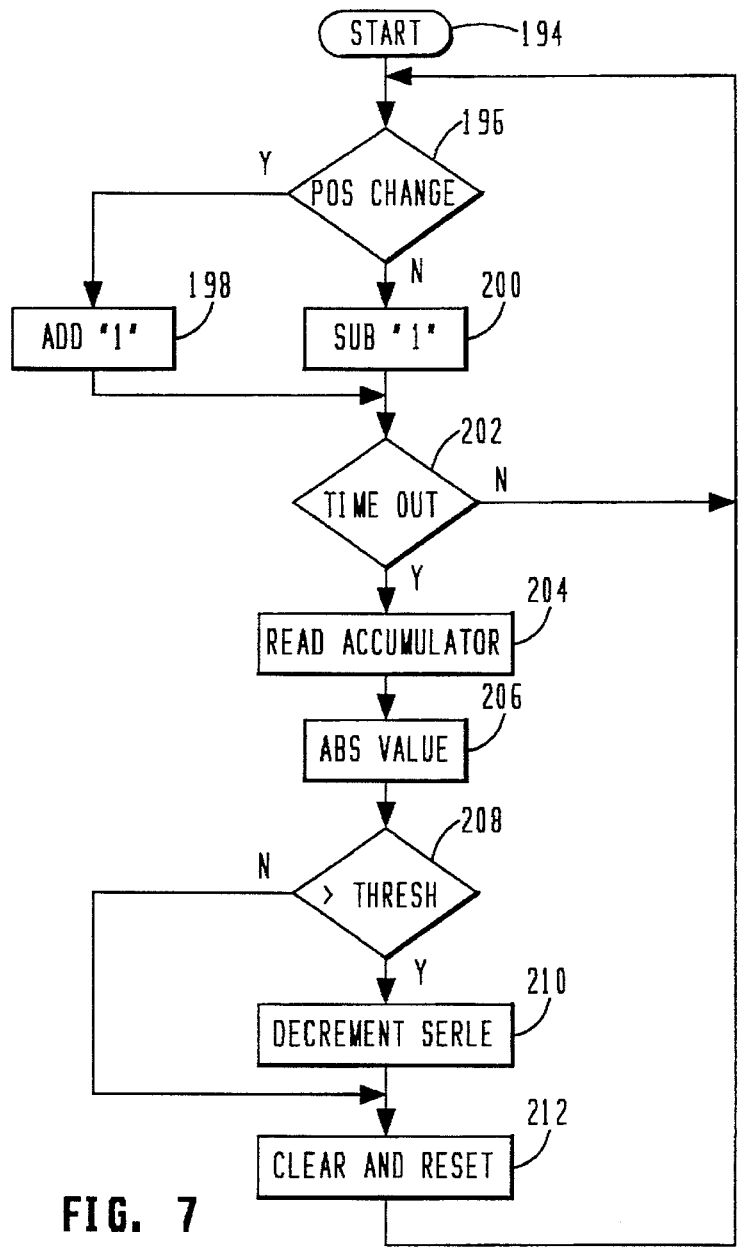
FIG. 7 illustrates a flow chart of the radical path change operation.

Referring now to FIG. 7, there is illustrated a flow chart for the determination of radical path change, which is initiated at a Start block 194. The program then proceeds to a decision block 196 wherein it is determined whether a positive change exists for the update operation. This is obtained by averaging the delta values for all or select coefficients over a predetermined duration of time. Once this average is calculated, the determination is made as to whether it is a positive change or negative change. If positive, the program will flow along the "Y" path to a function block 198 to add a value of "1" to the accumulation register. If it is not a positive change, it must be a negative change and then the program flows to a function block 200 to subtract the value of "1" from the accumulation register. This will continue for a predetermined period time, as represented by a time out decision block 202 which will flow back to the input of decision block 196 until a time out has incurred. After the time out has occurred, the program will flow from the decision block 202 along a "Y" path to a function block 204 to read the value in the accumulator. This value then has the absolute value thereof calculated in a function block 206 and then flows to a decision block 208. The decision block 208 determines whether the absolute value of the accumulator contents are greater than a predetermined threshold. If so, the program will flow along the "Y" path to a function block 210 to decrement the SERLE value stored in the register 70 and, if it is not greater than the threshold, the program will flow along an "N" path. If the decision is negative or if the value in the register 70 has been decremented, the program will then flow to a function block 212 wherein the value in the accumulator is cleared and then reset, as described above, and then the program will flow back to the input of the decision block 196 to again determine if a radical path change is still present. Alternately, the radical path change detection operation results in clearing of the SERLE value, clearing of the coefficients and initializing of the best far-end noise power to a maximum power value.

Figure 7A:
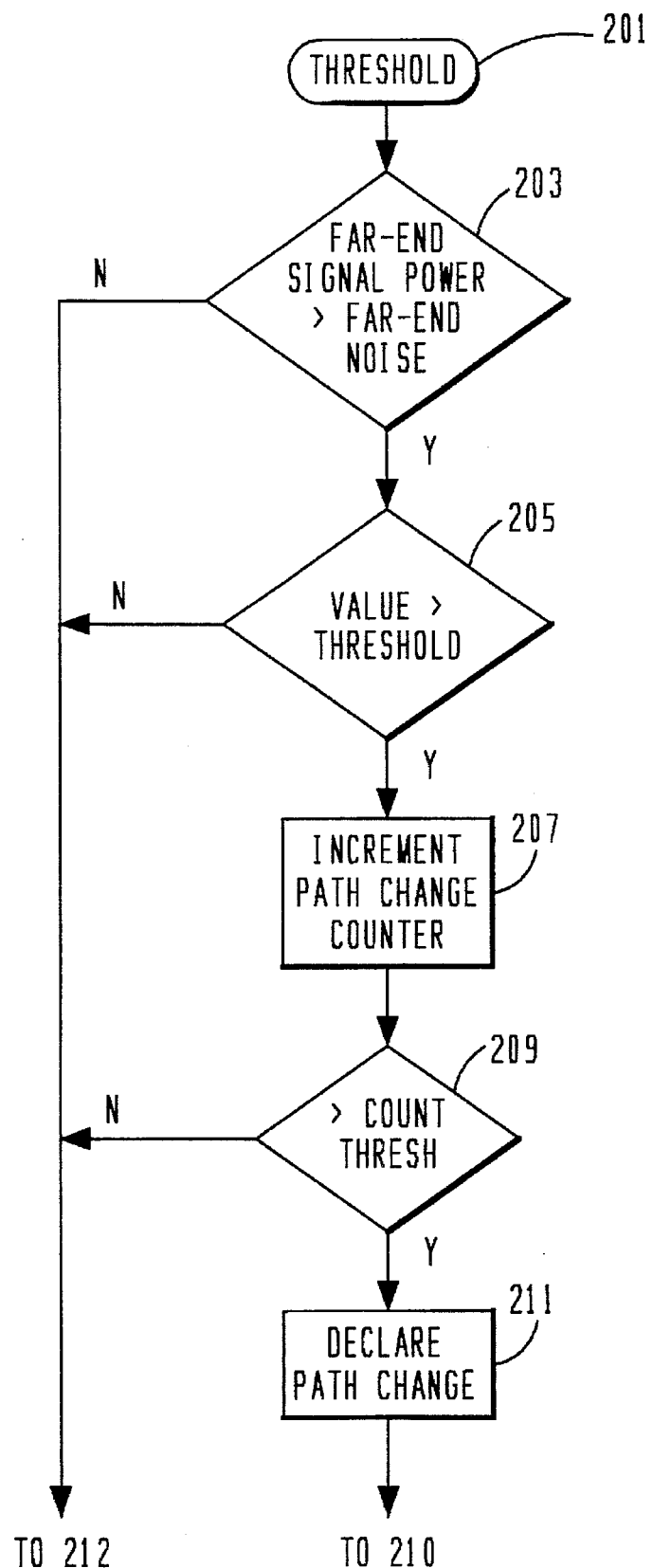
FIG. 7a illustrates a flowchart for the operation to determine if a path change has occurred.

Referring now to FIG. 7a, there is illustrated an alternate method for determining if the value stored in the accumulator is greater than a threshold. In this operation, a path changed detection is conditioned on signal-power level from the far end, wherein a path change may only be declared when the signal-power from the far end is above the far-end background noise power by some pre-determined amount. Additionally, to maximize confidence in path-change decisions, multiple declarations of path change must be made before acting on them and declaring a path change.

In the flowchart FIG. 7a, the threshold operation is initiated at a block 201 and then the program proceeds to a decision block 203 wherein a determination is made as to whether the far-end signal power is greater than the far-end noise power by more than a pre-determined amount. If so, the program flows along the "Y" path to a decision block 205, and if not, the program flows along the "N" path to the function block 212 of FIG. 7. The decision block 205 determines whether the value stored in the accumulator is greater than the pre-determined threshold. If not, the program flows along the "N" path to function block 212 and, if so, the program flows along the "Y" path to a function block 207 wherein a path change counter is incremented. This path change counter is decremented whenever a path change is declared, i.e., when the program flows to the function block 210 in FIG. 7. After this counter has been incremented, a decision block 209 determines whether a count threshold has been passed. If not, the program will flow along the "N" path to function block 212 and, if so, the program will flow along a "Y" path to a function block 211 to declare a path change and then to the function block 210. As described above, the function block 210 is the operation wherein, in one embodiment, the SERLE value is decremented. In another embodiment, the SERLE value is cleared, the best noise value is initialized and the best far-end input power level is cleared.

Figure 8:
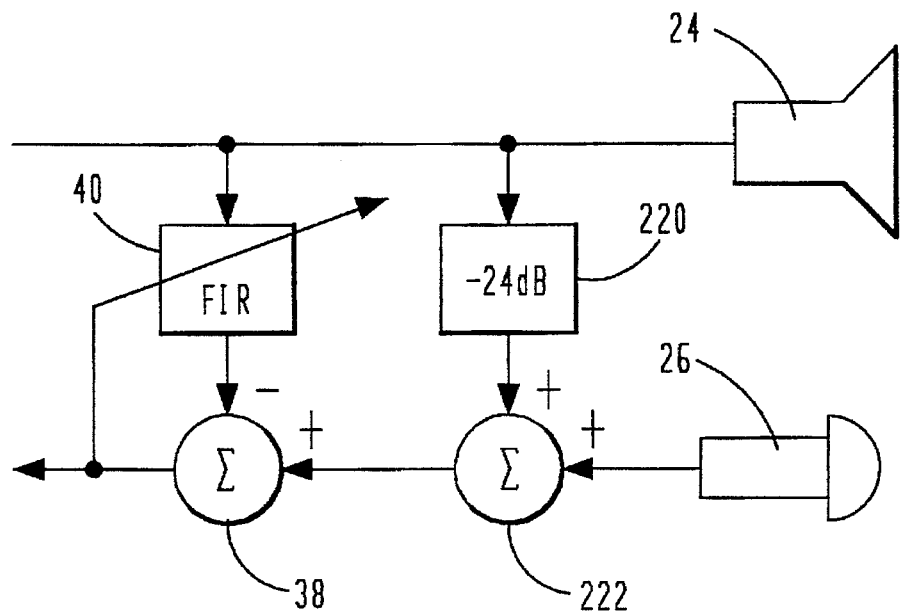
FIG. 8 illustrates a block diagram of the sidetone circuit of the present invention.

Referring now to FIG. 8, there is illustrated a block diagram of a circuit for accounting for sidetones. In general, a speaker phone configuration will have the microphone and the speaker connected close together. If this is the case, then there will be a high probability of having fairly strong return echo which will allow the adaptive filter to operate. Typically, when the system is initialized, the adaptive filter must be trained. In order to be tried, it must have some type of return path echo. During the training operation, the speaker phone will typically operate in half-duplex mode. Once the adaptive filter 40 is trained, then the system will switch over to full-duplex operation. It is desirable to have the system operate in a full-duplex mode, since this provides all of the advantages of an echo canceller.

Whenever the configuration of the system is such that there is very little return path echo, such as a situation wherein a personal computer is utilized and the microphone 26 and speaker 24 are separated by a large distance, this can result in a situation where the system will remain in half-duplex mode. To account for this situation, a predetermined amount of return path echo is inserted in the form of a return path 220 which feeds back the input to the speaker attenuated by a factor of, in the preferred embodiment, 24 dB to a summation circuit 222. The summation circuit 222 is operable to sum the return path value attenuated by, in the preferred embodiment, 24 dB with the output of the microphone, this then being fed to the subtraction circuit 38. Therefore, there will always be an ERLE calculated, even in the event of no external return path. This in effect allows the adaptive filter 40 to train itself such that a system can then operate in full-duplex mode.

Figure 9:
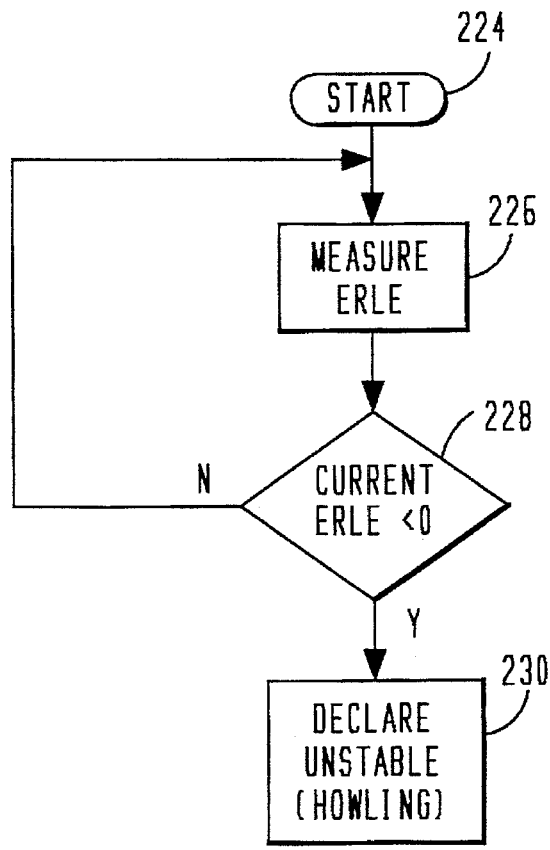
FIG. 9 illustrates a flow chart of the howling detector.

Referring now to FIG. 9, there is illustrated a flow chart depicting the operation of the system to account for a "howling" mode, which is another technique to provide for radical path change detection. Howling is a situation wherein the adaptive filter actually enters an "additive" mode wherein the estimated power at node 44 is greater than it should be and in fact is greater than the input on node 36 to the subtraction block 38. The flow chart is initiated at a Start block 224 and then proceeds to a function block 226 to measure the ERLE and then to a decision block 228 to determine if the current ERLE value is less than zero by a predetermined value, such as 12 dB in the preferred embodiment. If so, this indicates an additive system and the program will flow along a "Y" path to a function block 230 to declare the system unstable, i.e., howling. If not, the program will flow along a "N" path back to the input of the function block 226.

A disadvantage to gradually decreasing the value of SERLE is that updates may eventually be enabled during times when the near-end noise floor is elevated. This can become an important issue, due to the fact that the ERLE in practical applications is limited by the near-end noise level. If the near-end noise level rises, and the echo canceller is allowed to update, the ERLE is likely to decrease. Fortunately, the elevated noise will likely mask much of the resulting higher echo from the perspective of the far end. Unfortunately, the loop-gain reduction being provided by the echo canceller will also decrease. If the far end is relying on the near-end echo canceller for a loop-gain reduction, the loop may go unstable, if the SERLE is reduced too much.

To prevent unnecessary degradation to the ERLE due to rises in the near-end noise floor, it is necessary to block updates when the near-end background noise level rises significantly. In particular, the background near-end noise level is saved whenever the SERLE is replaced with the current value of ERLE. Then, updates are blocked whenever the current near-end noise floor is higher (in the preferred embodiment, 6 dB) than the saved background noise level. This technique assumes that either radical path changes will not occur while updates are blocked due to updated near-end noise, or alternatively, that a supplementary path-change detector as described above is available.

Figure 10:
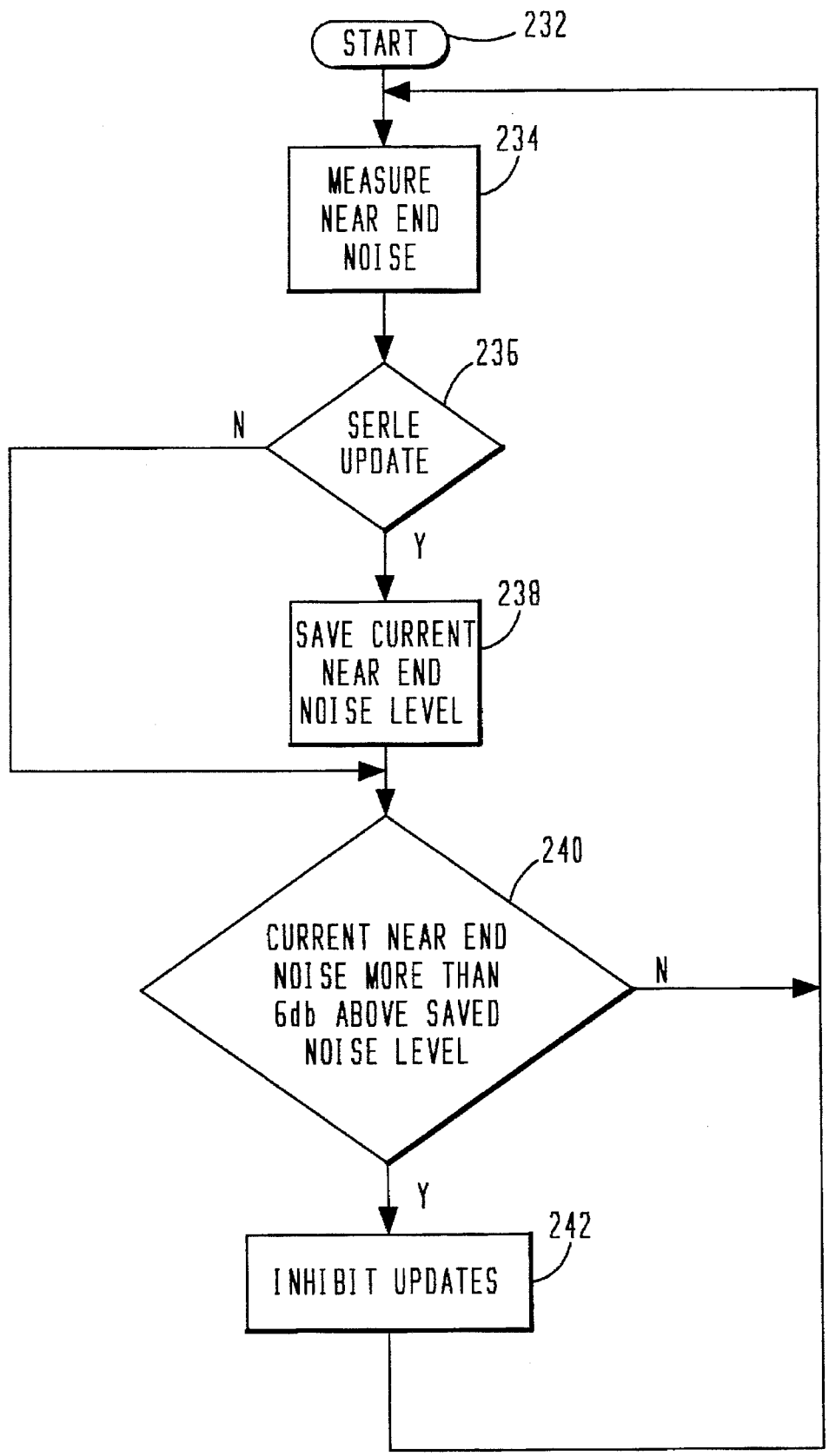
FIG. 10 illustrates a flow chart for the operation to inhibit updates as a function of near-end noise level.

Referring now to FIG. 10, there is illustrated a flow chart depicting the operation of inhibiting updates whenever the near-end noise increases. The flow chart is initiated at a Start block 232 and then flows to a function block 234 to measure the near-end noise. The program then flows to a decision block 236 to determine if the stored value of ERLE has been updated and if so, the program will flow along the "Y" path to a function block 238 to save the current near-end noise level. If not, the program will flow along the "N" path to the output of function block 238. At this point in the program, the program will flow to a decision block 240 to determine if the current near-end noise level is greater than 6 dB above the saved noise level. If so, the program will flow along the "Y" path to a function block 242 to inhibit updates. If not, the program will along "N" path back to the input of function block 234. After the updates are inhibited, the program flows back to the input of function block 234. When the updates are inhibited, this will continue until it is determined that the program flows along the "N" from decision block 240, at which time the updates will be allowed if previously inhibited.

It is desirable in the operation of the echo-canceller to not update the active filter 40 while tones are present as the training signal. If an adaptive filter trains on a tone, the ERLE for that tone is likely to be excellent, but if different tones or wideband signals are subsequently passed through that echo-canceller, the ERLE is likely to be worse, at least until the adaptive filter retrains itself.

Figure 11:
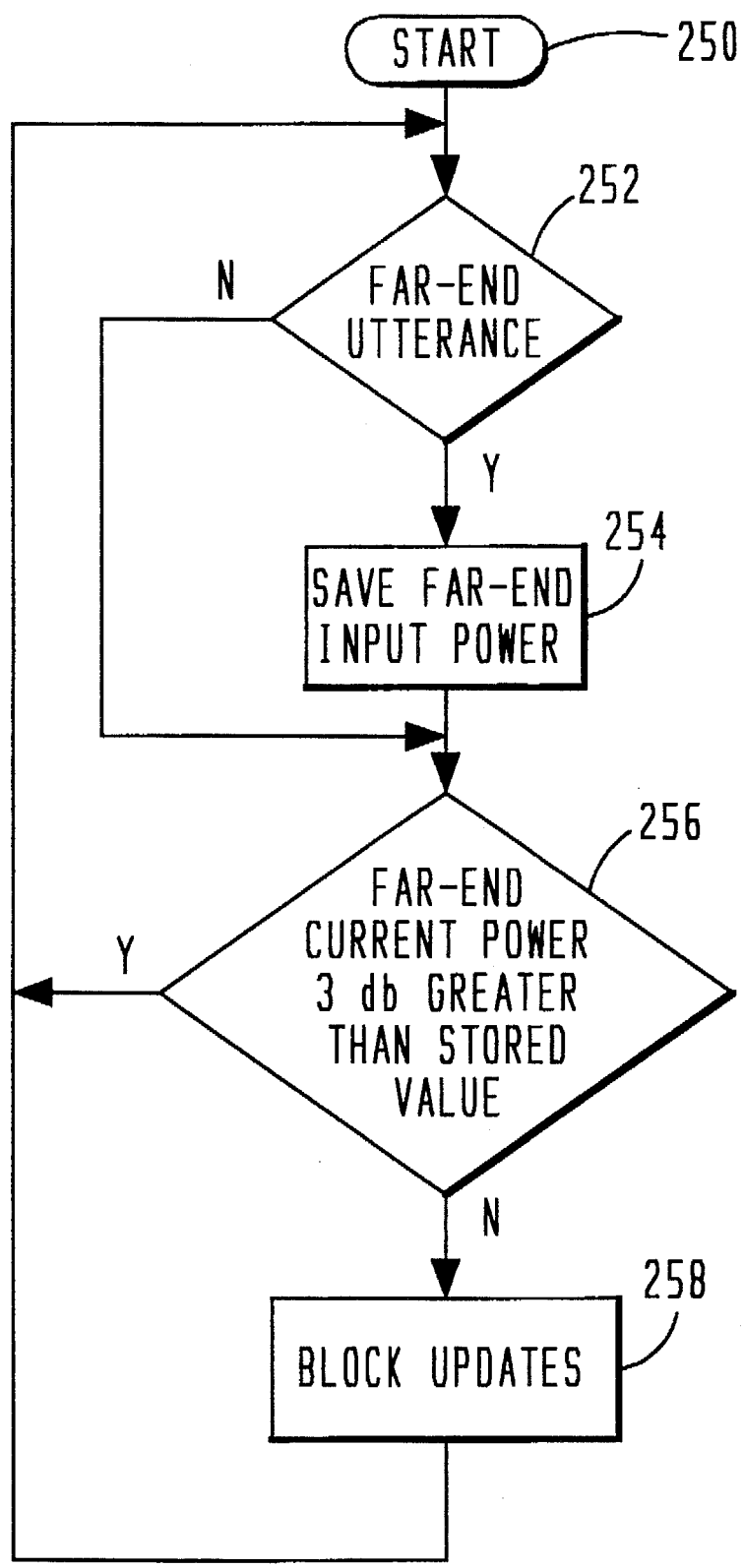
FIG. 11 illustrates a flow chart for the update blocking operation during tones.

To block updates during tones, the flow chart of FIG. 11 is referred to. In FIG. 11, the flow chart is initiated at a Start block 250 and then proceeds to a decision block 252. The decision block 252 determines whether a far-end utterance has been declared. If so, the program flows along a "Y" path to a function block 254, wherein the current far-end input power is saved in a register as the saved far-end input power. The program then flows to a decision block 256. If the decision block 252 determines that a far-end utterance has not been declared, the program flows along an "N" path to the decision block 256. The decision block 256 determines whether the current far-end input power is greater than the stored value in the register by 3 dB, in the preferred embodiment. If not, the program flows along the "N" path to a function block 258 to block updates. If so, the program flows along the "Y" path back to the input of decision block 252, this also being the path from the function block 258.

The assumption in the process of the present apparatus is that tones are constant-power processes, independent of their spectral characteristics. Speech, on the other hand, is not. If speech is present as the training signal, one would expect that its power level would quickly drift outside the plus ±3 dB power bounds, enabling updates. It is noteworthy that white noise is typically a constant-power process, such that updates would also be blocked when an "utterance" consisting of white noise is received. This is important, since such white noise bursts are frequently utilized to test the performance of echo-cancellers.

Figure 12:
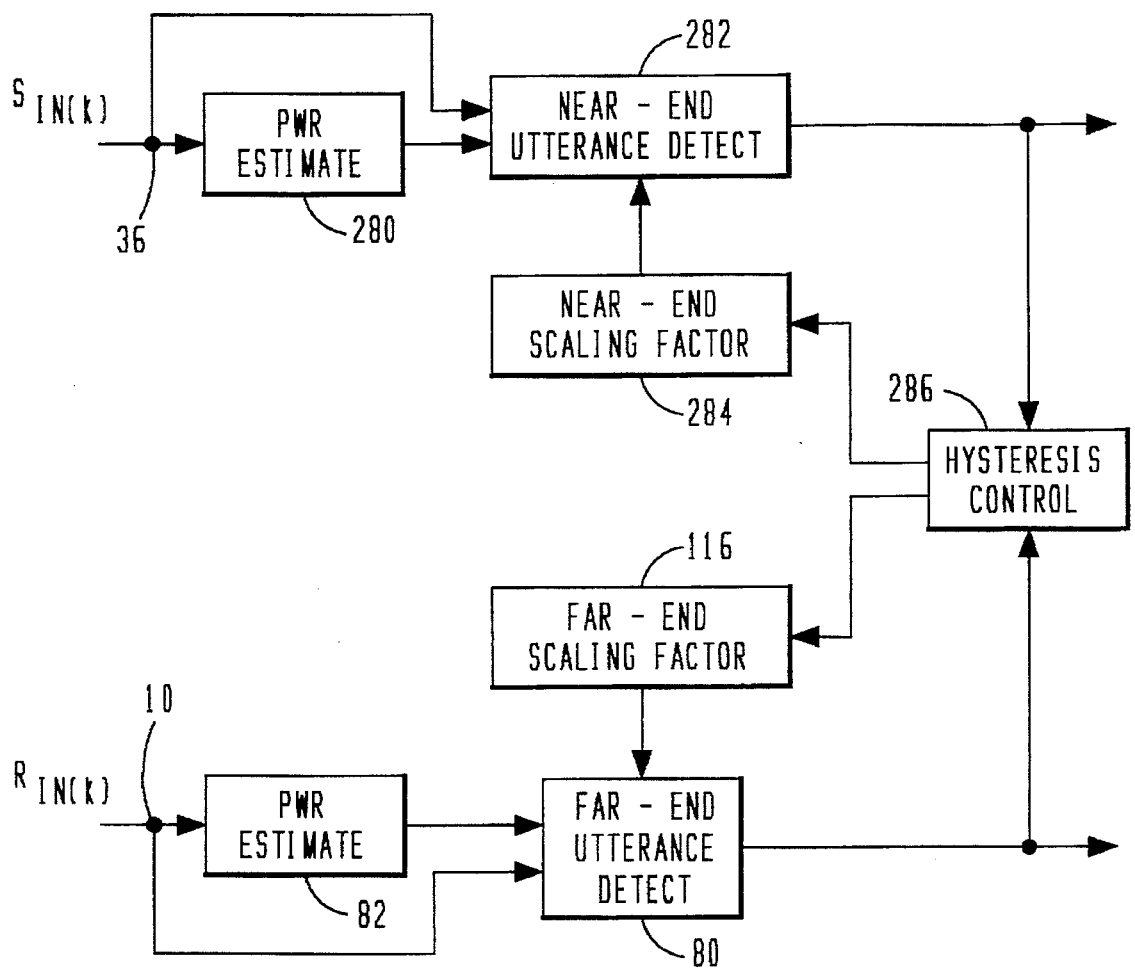
FIG. 12 illustrates a block diagram of hysteresis control of the utterance detection operation.

Referring now to FIG. 12, there is illustrated in alternate embodiment with respect to the way in which the utterance detect operation is performed. As mentioned above, the detection of a far-end utterance can be made in addition to detection of a near-end utterance. The far-end utterance detection is achieved with the detection block 80 as described above with respect to FIGS. 2 and 3 with a scaling factor provided by block 116, this being a fraction of the stored background noise which is input to a comparator, this being compared to the absolute value of the raw input signal $R_{in}(k)$. Similarly, the raw transmitted signal $S_{in}(k)$ on node 36 is input to a power estimator 280 to provide an estimate of the background noise at the near end. The output of the power estimator block 280 is input to a near-end utterance detect circuit 282, similar to the utterance detect circuit 80. This utterance detect circuit 282 is also operable to receive the raw input signal $S_{in}(k)$ and utilize a near-end scaling factor in a block 284 in order to provide a threshold by which to compare the absolute value of the raw input signal $S_{in}(k)$.

In this embodiment, hysteresis is provided by the hysteresis control circuit 286 that is operable to determine the scaling factor for each of the far-end scaling factor block 116 and the near-end scaling factor block 284. The hysteresis control circuit utilizes the output of each of the utterance detect circuits 80 and 282, as will be described herein below.

Figure 13:
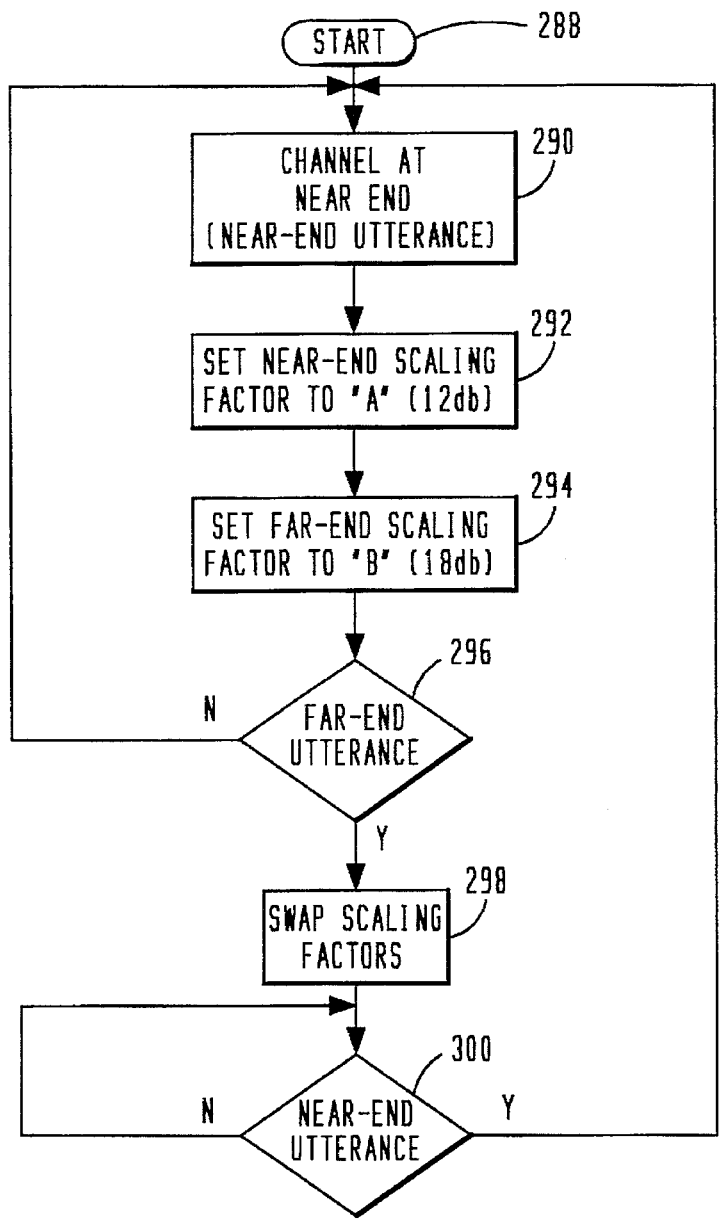
FIG. 13 illustrates a flowchart for the structure of FIG. 12.

Referring now to FIG. 13, there is illustrated a flowchart depicting the operation of the hysteresis control block 286 of FIG. 12. The program is initiated at a Start block 288 and then proceeds to a function block 290 which indicates that a near-end utterance has been detected. In this condition, it is noted that the party at the near end has "seized" the channel. The program then flows to a function block 292 wherein the near-end scaling factor is set to value "A", which in the preferred embodiment is 12 dB. The program then flows to a function block 294 to set the far-end scaling factor to value "B", which in the preferred embodiment is 18 dB. The program then flows to a decision block 296 to determine if a far-end utterance has been detected. If not, the program will flow back along the "N" path to the input of function block 290. When a far-end utterance is detected, the program will flow along the "Y" path to a function block 298 wherein the scaling factors are swapped between the two scaling factor blocks 116 and 284, such that now the near-end scaling factor will be 18 dB and the far-end scaling factor will be 12 dB. The program then flows to a decision block 300 wherein a determination is made as to whether a near-end utterance has been detected. If not, the program will flow back to the input of decision block 300. When a near-end utterance is detected, the program flows along the "Y" path back to the input of the function block 290. This system allows for the scaling factor to be set low at the near end relative to the far end scaling factor whenever an utterance is detected at the near end. Therefore, a far end utterance must be stronger in order to seize the channel away from the near-end.

Figure 14:
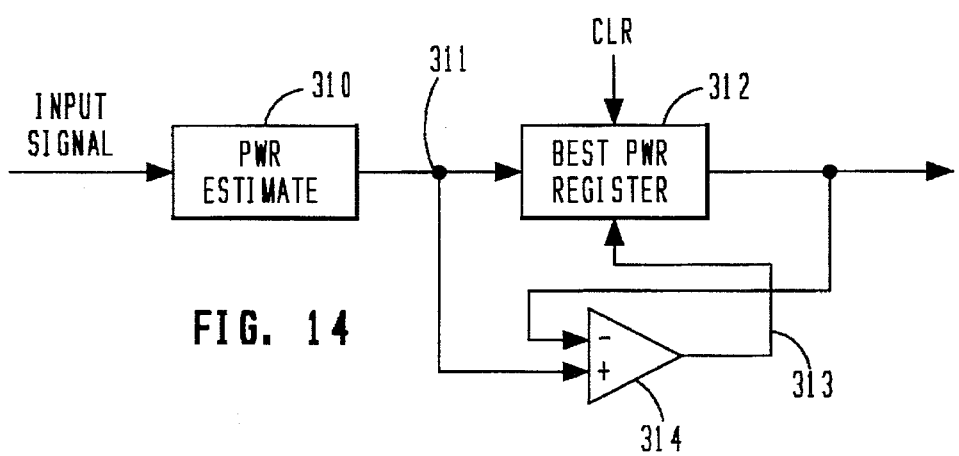
FIG. 14 illustrates a block diagram of the best signal power register.

Referring now to FIG. 14, there is illustrated a block diagram of the register for storing the best signal power. Each of the signals $R_{in}(k)$ and $S_{in}(k)$ are measured as an input signal with a power estimator 310, which is identical to either power estimator 82 or power estimator 280 in FIG. 12. The power estimator 310 determines the power in the input signal and outputs it on a node 311. Node 311 comprises an input to a best power register 312 which is operable upon receiving a latch signal to latch the value in the register 312. A comparator 314 is operable to provide the latch signal on an output 313. The comparator 314 has the positive input thereof connected to the node 311 and the negative input thereof connected to the output of the register 312. Therefore, the contents of the register 312 comprises the reference input to the comparator 314 and, whenever the node 311 has a value on it that is greater than the value stored in the register 312, an update signal is generated on the output line 313. Additionally, the contents of the register 312 can be cleared with a signal CLR.

Figure 15:
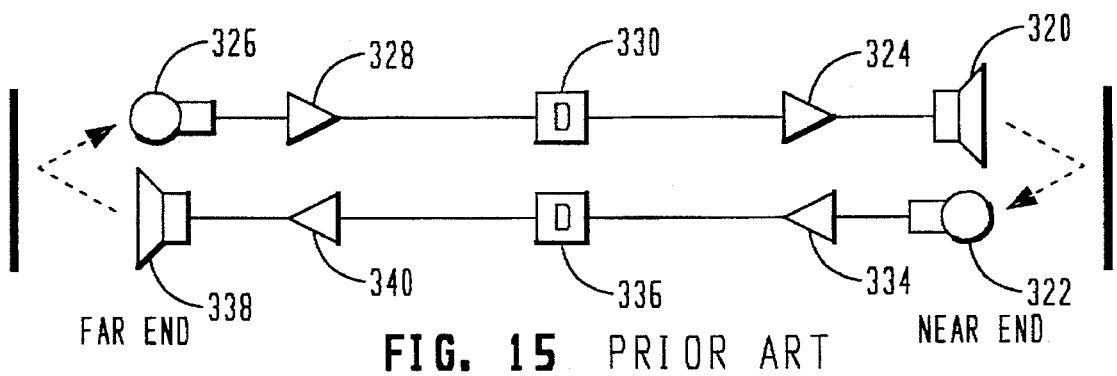
FIG. 15 illustrates a block diagram of a general system illustrating the acoustic-echo problem.

Referring to FIG. 15, there is illustrated a block diagram of a prior art system illustrating the far end and the near end and an associated acoustical echo, and the acoustical echo problem. At the near end, there is illustrated a speaker 320 and a microphone 322, the speaker 320 driven by an amplifier 324. A corresponding microphone 326 at the far end receives a signal from the far end and processes it through an amplifier 328 to pass it through a transmission line 330 to the amplifier 324 and the speaker 320. Very similarly, the microphone 322 receives the signal at the near end and passes it through an amplifier 334 through a transmission line 336 to a speaker 338 through an amplifier 340. Therefore, a signal in the form of speech from the far end will be injected into an echo path, i.e., a car interior for example. When the signal is injected, it reflects off of the surfaces in the echo path, and is then received at the microphone 322. When heard by the far-end user, these reflections, i.e., echos, can be very annoying. If echo also occurs at the far end, a closed feedback loop results; if the loop gain is high enough, the loop will go unstable, causing acoustic "howling".

Figure 16:
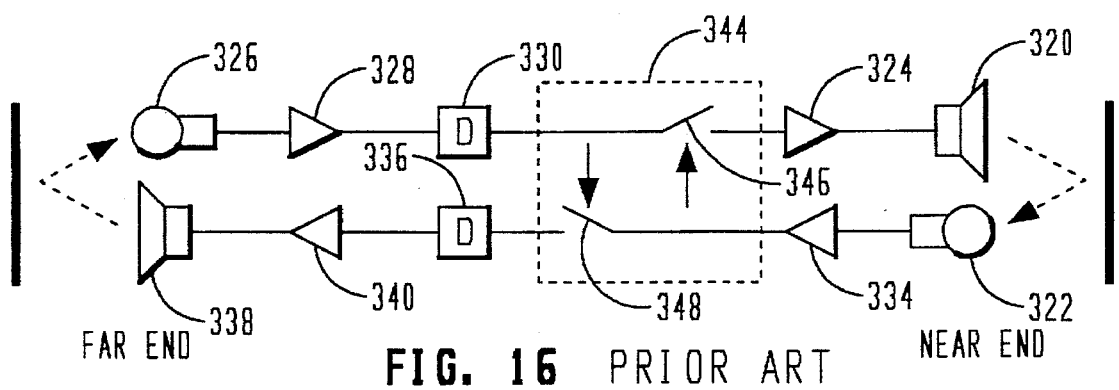
FIG. 16 illustrates a prior art half-duplex solution to the problem illustrated in FIG. 15.

Referring now to FIG. 16, there is illustrated one prior art solution to the acoustic howling problem. This is referred to as a half-duplex mode. In this mode, a half-duplex device 344 is disposed at the near end. The half-duplex device is comprised of a first series switch 346 disposed between the transmission line 330 and the amplifier 324 at the near end and controlled by the signal transmitted to the far-end. A second series switch 348 is disposed in series with the amplifier 334 and the transmission line 336 and controlled by the signal input to the switch 346 at the near end. In this mode, the far-end user is prevented from hearing echos by turning off the microphone at the near end while the far-end user is talking. The problem with this technique is that, although conversation is nominally half-duplex, full-duplex episodes are likely to occur, i.e., people typically talk one at a time, but frequently interrupt each other.

In addition to the above, noise events frequently occur in the near-end and far-end environments that are irrelevant to the information flow between speakers. Any method utilized to control which speaker can talk at any particular time should be as robust as possible to such noise. Half-duplex communication is therefore inherently unnatural, and it frequently annoys anyone accustomed to full-duplex communication. However, there are some advantages to half-duplex systems. They are cheaper to implement and their performance is less dependent on the attributes of the operating environment. As a result, half-duplex continues to have useful applications. In these applications, it is important to make the half-duplex system allow conversation that is as close to normal as possible. Specifically, figures of merit for half-duplex techniques in accordance with the present apparatus include:

1) Quick Response to the onset of speech. If the system is idle (i.e., both the far-end and near-end speakers are silent), and then the speaker at one end starts talking, that speaker should get the channel quickly, with minimal corruption of the start of his first utterance.
2) Resistance to irrelevant noise in selecting who gets the channel. Noise transients that occur while the system is idle, or while one speaker is talking should not cause the system to transfer control of the channel to the other speaker.
3) Resistance to changing state due to near-end echo. Echo at the near end can look like near-end speech to the half-duplex control system. Ideally, the half-duplex system should not change state due to reflections of far-end signal into the near-end microphone.
4) Minimum "holdover". Robustness to echo is achieved using "holdover", i.e., preventing changing channel control for some time interval after the end of a speech sequence for a particular speaker. If holdover is too long, the ability of the other speaker to respond quickly will be compromised.
5) Equal access to channel, independent of signal strength. The louder talker (be it near end or far end) should not get the channel just because they are louder. The first speaker to talk should get the channel instead.
6) Ability to compensate for steady-state background noise. Steady-state background noise should not affect the decision of who gets the channel at any particular time.

Figure 17:
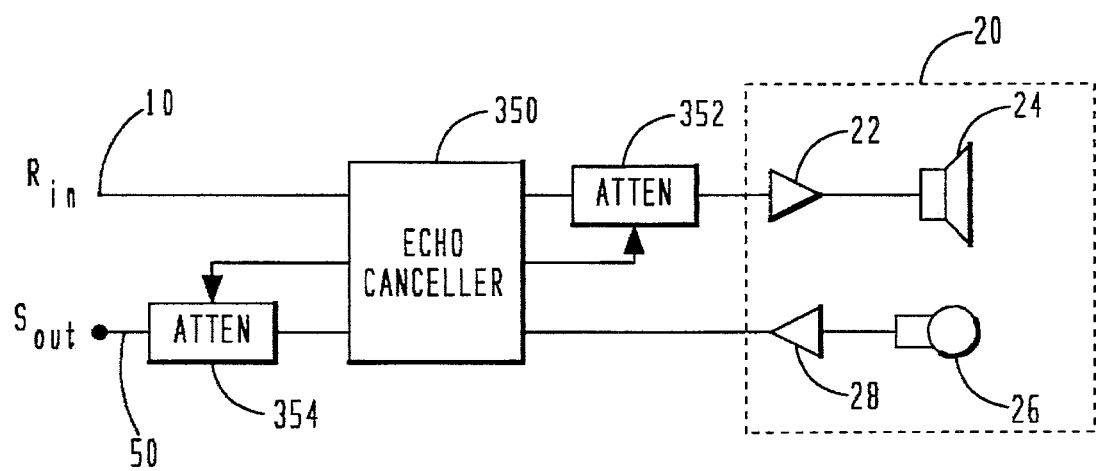
FIG. 17 illustrates a block diagram of an echo canceller utilizing a half-duplex mode.

Referring now to FIG. 17, there is illustrated a block diagram of the half-duplex operation of the echo canceller of the present apparatus. In FIG. 17, the echo canceller is generally referred to as a block 350. The block 350 receives as the input signal from the far end and provides an output to an attenuator 352. The output of the attenuator 352 is input to the amplifier 22 and then to the speaker 24. It should be understood that the attenuator 352 is part of the echo canceller 350 and is controlled by the echo canceller 350. As such, the attenuator 352 is realized in the digital domain and, it will therefore be on the digital side of the data conversion devices. In a similar manner, the echo canceller 350 also receives from the near end the output of the amplifier 28 and then attenuates the output signal to line 50 with an attenuator 354, this also being part of the echo canceller 350 and being in the digital domain. As will be described here below, the attenuators 352 and 354 provide the isolation switching operation for the half-duplex mode of operation. In addition, the echo canceller has a far-end and a near-end utterance detector, as depicted in FIG. 12, with two different attenuations provided therefor, depending upon whether the near end has access to the channel or the far end has access to the channel.

Figure 18:
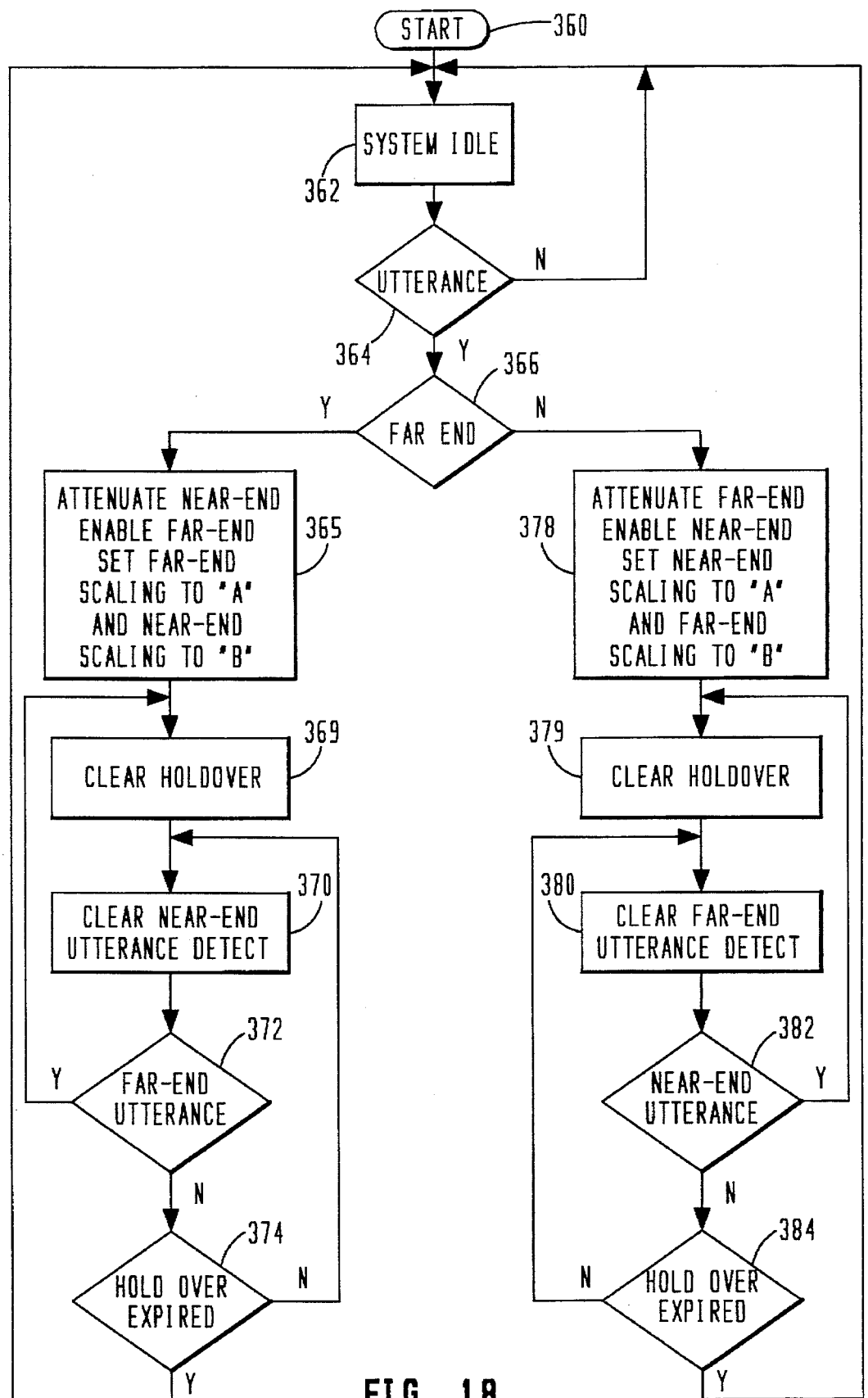
FIG. 18 illustrates a flowchart depicting half-duplex operation.

Referring now to FIG. 18, there is illustrated a flowchart depicting the operation in the half-duplex mode. A program is initiated at a Start block 360 and then proceeds to a Function block 362 that indicates that the system is idle. In this mode, there are no utterances detected at either the far-end or the near-end and the attenuations or scaling factors are set at undetermined values. As described above, an utterance is defined as a transition in the signal power at the far end or the near end. In order to realize this, at each sample time, the near-end input power and the far-end output power are measured utilizing a peak-detecting power estimator. Independent background noise-power estimates are maintained for the near-end input and the far-end input. For example, the near-end background power is calculated at each sample time by replacing the near-end background power estimate with the latest near-end power estimate if it is lower. If the near-end power is higher than the background noise power for a pre-specified period of time, the background noise-power estimate is increased slightly (to compensate for increases in the background noise-power level). At each sample time, the raw input from each end is compared to its respective background noise-power estimator. On rising excursions of the raw input signal in which the raw input signal crosses the background noise power scaled up by some pre-specified factor, an "utterance" indicator for that end is incremented. Whenever the background power estimate is lowered, the utterance detector for that end is cleared. This is represented by a decision block 364 which determines if an utterance has been detected. If an utterance has not been detected, the program will flow back to the input of the Function block 362 along the "N" path.

If an utterance is detected, it can be from either the far end or the near end. The program will flow along a "Y" path to a decision block 366 to determine whether it is the far end or near end. If it is the far end, the program will flow along a "Y" path to a Function block 368. Function block 368 indicates the operation wherein the far end is enabled and the near end is attenuated. The far-end scaling factor is set to the "A" level and the near-end scaling factor is set the "B" level. This was described hereinabove with respect to FIG. 13. Once the scaling factors have been set, the program will flow to a Function block 369 to clear a holdover counter and then to a Function block 370 to clear the near-end utterance detect and then proceeds to a Function block 372. Decision block 372 determines whether a far-end utterance has been detected. If so, the program flows along a "Y" path to the input of Function block 369 to clear the holdover counter and then to Function block 370 to again clear the near-end utterance detect. This continues until there is no far-end utterance detected. In this mode, the end that has seized control of the channel will maintain control of that channel as long as speech, or an utterance, is detected. Once an utterance or speech is not detected, the program will flow along the "N" path and a decision block 374 will determine if a holdover time period has expired. This holdover time period prevents the opposite end from seizing the operation of the half-duplex system for a specified period. The program will flow along the "N" path back to the input of the decision block 370 until this holdover time has expired and, the near-end utterance is cleared. If no utterances are detected during this period, then the program will flow along the "Y" path from decision block 374 back to the input of the system idle block 362. The holdover period is a function of the number of times that the system loops back to the decision block 370 from the decision block 374.

If the near end had seized control of the channel due to either the holdover period expiring or the system merely being seized by the near end, the program will flow from decision block 366 along the "N" path to a Function block 378. Function block 378 functions similar to Function block 368 in that it attenuates the far end and enables the near end, and basically "swaps" the scaling factor such that the scaling factor "A" is set for the near-end scaling factor and the scaling factor "B" is set for the far-end scaling factor. The program will then flow to a Function block 379 to clear the near-end holdover counter and then to a Function block 380, similar to Function block 370 to clear the far-end utterance detect, and then to a decision block 382, similar to decision block 372. This will determine if the near-end utterance has been detected. If so, the program will flow along the "Y" path back to the input of the Function block 379. If not, the program will flow along the "N" path to a Function Block 384, similar to the Function Block 374, and relating to the near-end holdover expiration. If it has not expired, the program will flow along the "N" path back to the input of Function block 380 and, if it has expired, the program will flow back to the input of Function block 362 along a "Y" path.

Figure 19:
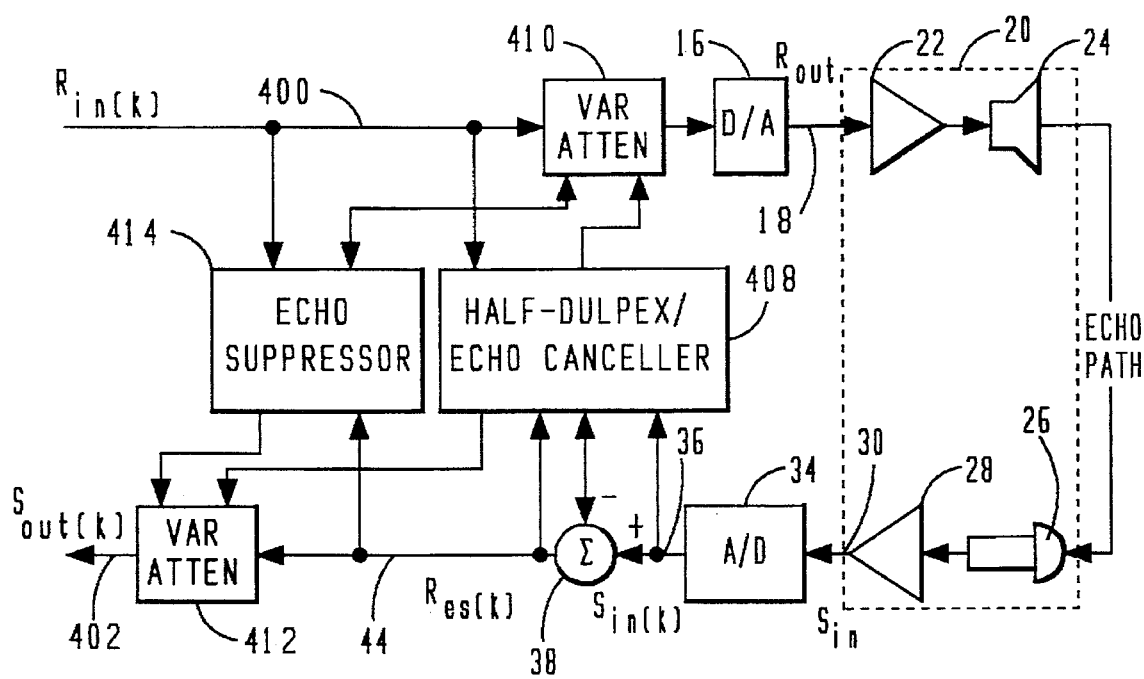
FIG. 19 illustrates a block diagram of a communication system utilizing an echo suppressor.

Referring now to FIG. 19, there is illustrated a block diagram of a communication system utilizing an echo suppressor. The communication system is as illustrated in FIG. 1 with the signal from the far-end, $R_{in}(k)$, being received on a receive line 400 and the output signal of the microphone 26, after echo suppression and, possibly, echo canceling, being output as the signal $S_{out}(k)$ on a transmit line 402, it being understood that the signals $R_{in}(k)$ and the signal $S_{out}(k)$ are in the digital domain. A half-duplex/echo canceller 408 is provided which basically represents a combination of the echo canceller described in FIG. 1 in the form of the double-talk detector 54 and the adaptive filter 40 and also the half-duplex operation described with respect to FIG. 17 hereinabove. The half-duplex/echo canceller 408 receives the far-end input signal $R_{in}(k)$ from line 400 and also the signal on line 44, Res(k), and also the $S_{in}(k)$ signal on node 36. Again, this is described above with respect to FIG. 1 and also with respect to FIG. 17 and the flowchart of FIG. 18.

A variable attenuator 410 is provided in the receive path from the far end to the near end. This is similar to the attenuator 352. Similarly, a variable attenuator 412 is disposed between the near end and the far end transmit paths, between node 44 and the output 402. The variable attenuator 412 is similar to the attenuator 354, with the exception that it has a variable attenuation as compared to the attenuators 352 and 354, which are binary in nature, with the exception that they have scaling factors associated therewith. The half-duplex/echo canceller 408 is operable to control the variable attenuators 410 and 412 to selectively insert attenuation into the respective paths.

An echo suppressor 414 is provided which is operable to receive the far end input signal $R_{in}(k)$ from line 400 and also the output signal from the output of the echo canceller 408, Res(k), on node 44. It is operable to control the variable attenuators 410 and 412, as will be described hereinbelow.

The echo suppressor 414 is operable to control the attenuators 410 and 412 to selectively set the attenuations thereof at any particular time, depending upon the signal received from the far end and the signal transmitted from the near end. The attenuation levels are such that full-duplex communication is allowed such that, if both ends are talking at the same time, the attenuation will be minimized to minimize the source of the signal, thereby making both parties easy to understand. This is also the case when both sides are idle. If, however, the far end user is talking and the near end user is silent, and the echo at the near-end is low, then the attenuation would be high. The attenuation would be increased in order to reduce unexpectedly large echo.

Referring now to FIG. 20, there is illustrated a block diagram illustrating the far end and near end portions of the echo suppressor 414. The far-end signal $R_{in}(k)$ is input to a peak detect IIR filter 420, and an output is provided on an output 421, which is described above with reference to FIG. 2 and equations 2 and 3. The output of the peak detect circuit 420 comprises the far-end signal power, which is a peak detected estimated power. The input $R_{in}(k)$ is utilized to estimate a background noise value, which is then stored in a background noise estimate block 422. Again, this is as described above with reference to FIG. 2 and the background noise estimate circuit 82 and also FIG. 3. In FIG. 3, it is noted that the background noise is stored in a background register 104. This value is what comprises the output of the background noise register 422. It should be noted that the power thereof is incremented, as described above with respect to FIG. 3.

The background noise, once obtained, is utilized in conjunction to the estimated signal power on node 421 as inputs to a normalized power block 424, which is operable to determine a normalized power of value. Normalized near-end and far-end signal power estimates are calculated by first determining if the background noise level is zero. If so, then the power on node 421 comprises the normalized power level. If, however, the background noise is not low, then both the background noise value in register 422 and the value on node 420 are divided by a factor of 2 and then a comparison made again. This division by 2 is continued until the background noise is substantially zero. At that point, the divided value of the signal power comprises the normalized power level. This is output on a line 426.

Similar to the operation described with respect to the far-end signal power, the near-end transmit power $S_{in}(k)$ is input to a peak detect IIR filter 428 to provide an estimated power on a node 430. A background estimator and background noise register 432 is provided for receiving $S_{in}(k)$ and estimating and storing the background noise level, the node 430 and the output of the register 432 then input to a normalized power block 434 to determine the normalized power level. This is output on a line 436. Therefore, both a near-end and a far-end normalized power level are provided on lines 436 and 426, respectively.

A far-end power ratio is calculated by dividing the normalized far-end signal power by the normalized near-end signal power in a block 438. Similarly, the near-end power ratio is calculated in a block 440 by dividing the normalized near-end power signal by the normalized far-end power signal.

In the preferred embodiment, the near-end power ratio and the far-end power ratio are just reciprocals of each other. However, they are calculated separately since, in the preferred embodiment, they are calculated utilizing unsigned integer division, which is well known in the art. With integer division, if the divisor is smaller than or equal to the dividend, the result is the maximum-positive value. Only if the divisor is greater than the dividend, is the result anything other than the maximum positive value. For each power ratio, the important case is when the divisor is greater than the dividend. To allow each power ratio to have meaningful values when its ideal dividend is greater than its divisor, the power ratios are calculated separately. However, it should be appreciated that a full division operation could be utilized.

Once the power ratios are determined in the blocks 438 and 440, the output of block 438 is input to a priority encode circuit 442 and the output of the power ratio block 440 is input to a priority encode block 444. The priority encode operation is a well known operation, which is effectively the log, base 2, of the power ratio. Since this is a sixteen-bit word, what is examined is the most significant "one" value bit in the word. This provides indices from which to operate. For example, if the value were such that the thirteenth through fifteenth bits were a value of "0" and the twelfth bit was a value of "1", this twelfth bit would provide the relevant indices. Therefore, there would be up to sixteen indices, of only which 15 are utilized in the present invention. This would allow 15 "pointers" to be provided by a single word. In this situation, once the most significant "one" bit is determined, the lower bit values are of no significance. The 16 indices are then utilized to access attenuation or scaling factors in a table 450 for the far end and 452 for the near end. The output is a far-end attenuation scaling factor in dB.

The look-up tables 450 and 452 contain possible scale factors for each of the attenuators 410 and 412. In general, the actual power ratio value could be utilized directly as an index to the look-up table, but the required table would be rather unwieldily. By priority encoding the power ratios, only one table location is required for 6 dB steps of the power ratio, thus greatly reducing the size of the table. However, reducing the size of the table reduces resolution, and therefore, perceived quality. To improve the resolution, and thereby, the perceived quality, the resolution could be reduced to a higher resolution, for example 3 dB per table location, with a corresponding increase in the table size. In the preferred embodiment, a 3 dB per table location is utilized.

The values of the look up table are proportional scale factors, meaning that the maximum-possible scale factor would produce a zero dB attenuation (7FFFh in sixteen-bit arithmetic), and the attenuation provided by the other scale factors would be proportional to their values (e.g., 3FFFh would provide 6 dB of attenuation). The level of attenuation vs. the indices is illustrated in FIG. 21 showing a relatively small step at mid attenuation levels with larger steps in the intermediate regions between the high attenuation and low attenuation areas.

The values in the table critically determine the perceived performance of the echo suppressor. In the preferred embodiment, the look-up table is divided into three sections. The first section is one with no attenuation. In this section, the top few locations, i.e., the locations at the highest addresses, are all set at 0 dB. In the preferred embodiment, the top four locations are set to 0 dB. There are two general cases in which these locations would be accessed: when the near end and the far end are talking at the same time, and when neither is talking (i.e., when both sides are idle). In both cases, the normalized power at each end are about equal, meaning that the power ratios are maximum-positive, such that both attenuators 410 and 412 would use the scale factor at the highest address and look up table. This is beneficial, since if both ends are talking at the same time, the attenuation should be minimized to minimize distortion of the signals, thereby making them as easy to understand as possible. This is also good if both ends are idle, since small fluctuations in the noise power level are essentially ignored, preventing undesirable and unnecessary modulation of the background noise.

In the second section, a high attenuation section, the bottom locations (in the preferred embodiment, the bottom 8 locations) are set to provide large attenuation per step (in the preferred embodiment, 3 dB per step). These locations would be accessed in instances in which there is a large disparity between the normalized signal power at the near end and the normalized signal power at the far end. Such a disparity would typically occur when the user at only one end is talking.

As an example of a high attenuation situation, if the far-end user is talking and the near-end user is silent, the only non-noise signal that should appear at the near-end input would be echo. Assuming the echo is weak, the far-end power ratio should be large and, therefore, only locations at high addresses should be accessed in this case. Since it is desirable to greatly attenuate the echo, the table locations that should be selected for the near-end transmit attenuator should provide large attenuation in this situation. If, on the other hand, the near-end user is talking and the far-end user is silent, there should be no echo from the far end, such that the near-end receive attenuator 410 may not seem necessary. However, if there is echo from the far end, particularly in applications that include a closed acoustic loop, near-end receive attenuation could still be useful for reducing the loop-gain, and thereby minimizing the likelihood of acoustic howling. Admittedly, in applications where a closed acoustic loop is not present, the near-end receive attenuator 410 is not needed, but is assumed to be necessary in the preferred embodiment.

If the only objective in a high attenuation condition were echo/loop-gain reduction, the attenuation value should ideally be infinite for cases where significant echo is expected to be present. There are, however, several reasons for less than infinite attenuation. First, time-variant attenuation modulates the near-end background noise from the far-end listener's perspective, which is disadvantageous. The attenuation should be minimized to minimize perceived background-noise modulation. Of course, artificial noise could be injected to compensate for attenuation, which is described hereinbelow, but such noise injection is only a partial solution. Secondly, strong attenuation utilizing double-talk could render weak near-end speech (which is indistinguishable in a power sense from echo) unintelligible from the far-end user's perspective. Although even small amounts of attenuation applied to speech that is already weak is likely to render it unintelligible, it is still useful to maximize the opportunity that weak speech can remain unintelligible. Third, rapid, large changes in the attenuation level can introduce undesirable switching artifacts. By making the attenuation steps smaller, the attenuation variation would be smoother, thereby reducing artifacts.

In the third section of the look-table, the medium attenuation section, the middle locations (in the preferred embodiment, the middle four locations) are set to provide low attenuation per step (in the preferred embodiment, 1 dB per step). These locations serve as a bridge between the high-attenuation locations and the low-attenuation locations. These locations would be accessed when the signal from one side is stronger, though not markedly so. Modest attenuation, which can assist in reducing unexpectedly large echo, can typically be applied under such conditions without introducing significant artifacts.

In order to define the values in the attenuation table, information is needed as to the maximum level that the echo is likely to achieve. The break in the table between high attenuation and medium attenuation would correspond to the lowest address expected to be accessed when one side is talking, and the other side is silent except for echo. This is typically determined by an iterative procedure. To avoid having an unnecessarily conservative break in the table, the break could be a function of volume settings in the system.

For example, if the near-end output volume is increased, a commensurate increase could be made to the location of the break in the table. This also suggests that the attenuator tables could be different for the near end and far end, with the near-end table reflecting the expected echo conditions at the near end and the far-end table reflecting expected echo conditions at the far end. This is the reason that different tables are utilized.

For the suppression system of the current invention, to provide full-duplex operation, it is important that the echo power be significantly lower than received speech power. Unfortunately, in many practical applications, the echo is typically higher. The best solution in such cases is to utilize an echo canceller in conjunction with the echo suppressor. The echo canceller can remove echo without effecting received speech, but it typical cannot sufficiently attenuate echo by itself.

In order to account for the practical limits of an echo canceller, the IIR filter utilized in the peak detection algorithm is provided with two poles, a fast pole and a slow pole. This allows the IIR filter to have two different responses, a slow response and a fast response. An echo canceller typically provides echo cancellation for approximately 50 ms. However, echo may remain for a longer duration of time. The echo suppressor is operating such that it will have a longer duration of time. In the echo suppressor, at each sample time, the IIR pole (") for both the near-end power estimator and the far-end power estimator are updated to reflect the current attenuation level. Larger pole values would be utilized when the high addresses associated with low attenuation values are accessed in the look up table, and smaller pole values would be utilized when low addresses associated with high attenuation values are accessed. In the preferred embodiment, only two possible poles are available, with a large (fast) pole being utilized in the low-attenuation (high-address) region, and the small (slow) pole being used in the medium and high-attenuation (low-address) regions.

Figure 22:
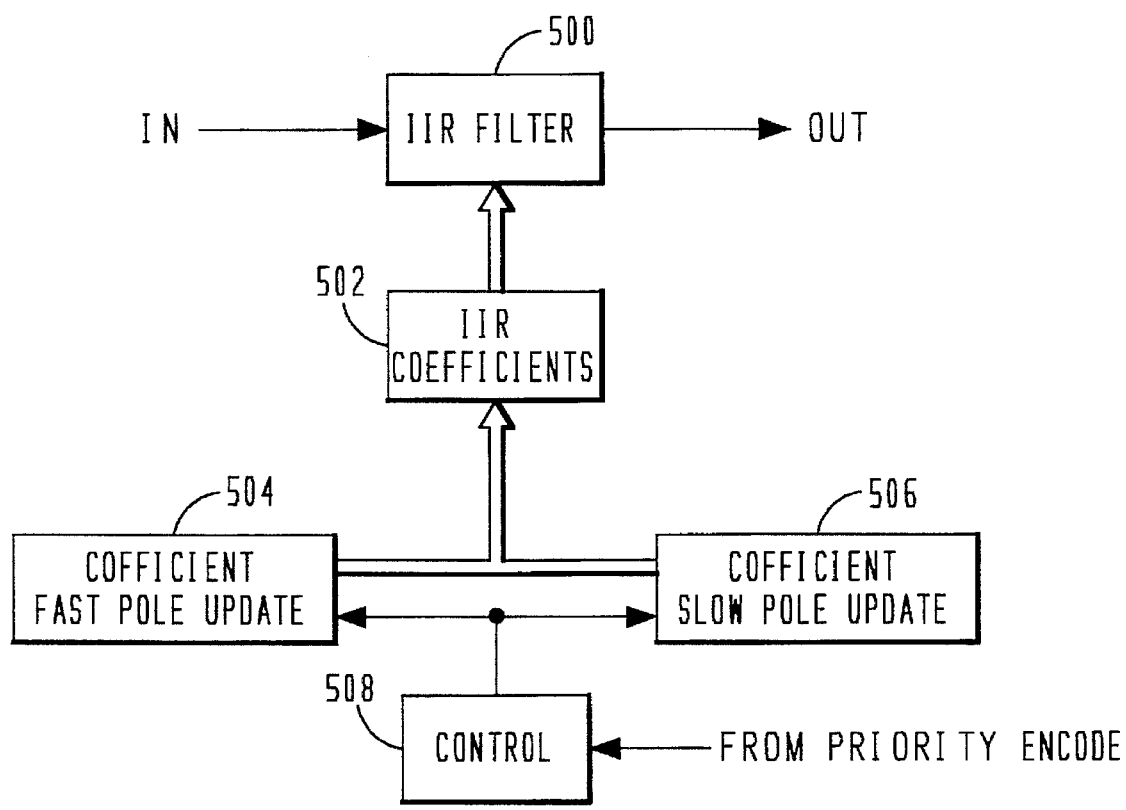
FIG. 22 illustrates a block diagram for the coefficient updating operation associated with the IIR filter.

Referring now to FIG. 22, there is illustrated a block diagram for the coefficient updating operation associated with the IIR filter. An IIR filter 500 is illustrated, which is utilized to realize the power estimation operation. The IIR filter 500 has associated therewith a coefficient memory 502 which is operable to store the IIR coefficients. The IIR filter 500 is, of course, a clocked system, such that it operates at a certain sampling rate, in the preferred embodiment, 8 kHz. There is a single pole " described in equation 2. The low or slow pole is approximately $2^{-9}$ and the large or fast pole is approximately $2^{-7}$ in the preferred embodiment. In order to change these poles, the appropriate coefficients must be substituted in the coefficient storage block 502. The fast pole coefficients are stored in a block 504 and the slow pole coefficients are stored in a block 506. The coefficients necessary to effect the pole change are uploaded into the IIR coefficient block 502 of the control block 508. The control block 508 basically utilizes the priority encode signal from the priority encode blocks 442 and 444 for the far-end and near-end attenuators, respectively, to form this selection. A "knee" is determined, above which one of the poles is utilized and, below which the other pole is utilized.

For example, if the far-end talker is speaking and the near-end talker is silent, the near-end power ratio should be small, meaning that an attenuation value from a low address is being selected from the attenuation table, and that the near-end transmit attenuation is large. In this case, the far-end power estimate should be calculated with the small pole, and the near-end power estimate should be calculated with the large pole. The small pole is used in this case to allow the high near-end transmit attenuation value to persist for as long as the echo. For that reason, the pole should be selected to reflect the time constant for the echo; i.e., the longer the echo is expected to persist, the smaller the time constant. This is advantageous when utilized in conjunction with an echo canceller, wherein the echo canceller operates only for a finite time. In acoustic environments that have been evaluated, it has been noticed that the echo decays at a linear rate on a log scale. For example, in automobiles, the echo tends to decay at approximately 1 dB per millisecond. The impulse response for single-pole IIR filters also tends to decay in this manner. As a result, IIR filters, or systems that produce approximations to an IIR response (i.e., decay exponentially), are ideal for this acoustic echo-suppression application. It should be noted, however, that network echo may not decay exponentially. In this case, some other decay characteristic may be appropriate.

The large (fast) pole is utilized in the above case to minimize the degradation to communications during double-talk that could be caused by the changing attenuation levels. In particular, if both the near end and the far end are talking at the same time, the power estimates (and thus the power ratios) should be allowed to fluctuate rapidly to track the rapidly varying power levels.

Figure 23:
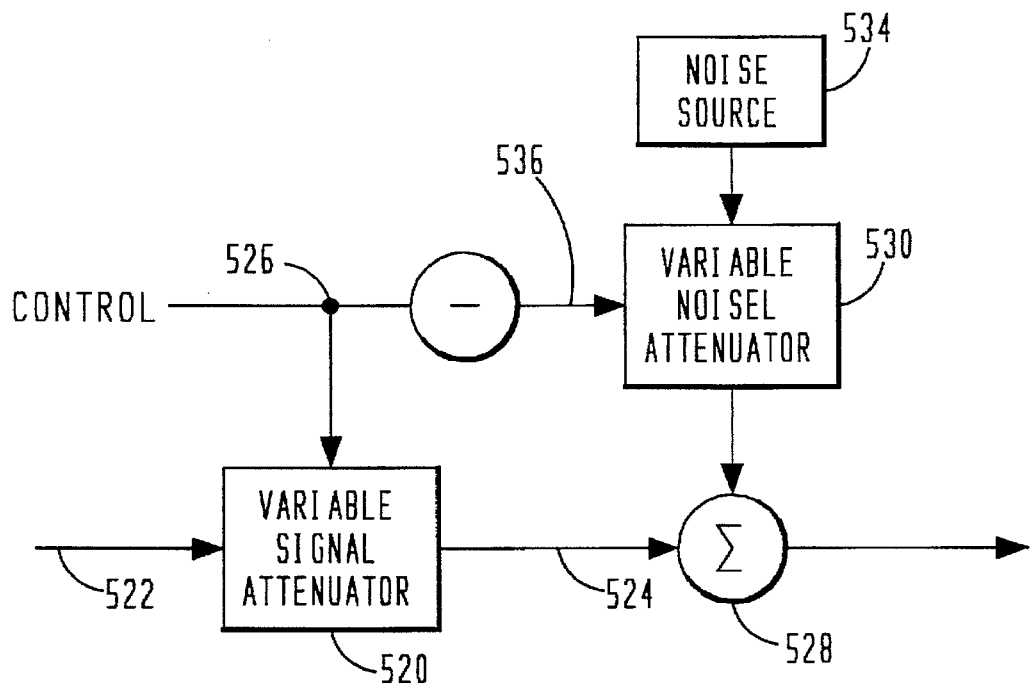
FIG. 23 illustrates a block diagram of the system for ameliorating modulation of background noise.

Referring now to FIG. 23, there is illustrated a block diagram of the system for ameliorating modulation of background noise. As described above, one disadvantage to variable-gain echo suppression is that it can modulate background noise. If the far-end talker is speaking and the near-end talker is silent, the near-end transmit attenuator will attenuate the signal from the near end toward the far end. Near-end background noise will be attenuated. When the far-end talker becomes silent, the background noise will return. This variation in the background noise level can be annoying to the far-end listener. In the block diagram of FIG. 3, a variable signal attenuator 520, representing the attenuators 410 and 412, is provided for attenuating the signal in the signal path from an input 522 to an output 524. The attenuating signal is received on a control line 526 and labeled Control. The output of the variable attenuator 520 on line 524 is input to a summing junction 528. The other input to the summing junction 528 is connected to the output of a variable noise attenuator 530. The variable noise attenuator 530 receives on the input thereof the noise output of a white noise source 534 and is operable to provide a variable amount of attenuation thereto in response to a control signal received on a line 536. The control signal on line 536 is the inverse of the signal on line 526, representing the fact that the attenuation provided by the variable noise attenuator 530 is opposite to that provided by the variable signal attenuator 520. For example, if 6 dB of attenuation were added by the variable attenuator 520, 6 dB of attenuation would be removed by the variable noise attenuator 530. In this manner, attenuation by the variable signal attenuator 520, which attenuates both signal and noise, would be offset by an increase in the noise added with the summing junction 528. As such, the noise source 534 adds white noise in proportion to the background noise power level, independent of the attenuation level. The noise will be added at a level below the estimated background noise level (in the preferred embodiment, 6 dB below), and, in this way, the added noise would be below the background noise level when the attenuation is 0 dB, such that it should not significantly increase the total noise power level. In the preferred embodiment, the total noise power is increased by 2 dB. The noise source 534 is a typical white-noise generator, with the one utilized in the preferred embodiment being an LFSR (Linear Feedback Shift Register)-based white-noise generator.

In the steady state condition, the added white noise should be largely masked by the background noise. When the suppression attenuation is increased, the signal power of the signals sent to the far end drops, but its drop is limited by the added white noise. As a result, the far-end listener will hear some noise modulation as the attenuation level varies, but that variation will be relatively small. With the added white noise, the spectral characteristics may vary, but the variation is much less noticeable.

One problem with this approach is that, if the far-end speaker talks without pausing over an extended time interval, he will hear a gradual rise in the white-noise level from the near end, even though there is no change in the actual near-end level. The solution for this is to save the near-end noise level at the start of each utterance, and use the saved noise level to set the added noise level. The noise level would be set at the end of each utterance. This will utilize the utterance detector described above with respect to FIG. 2, et seq.

In general, the above noted suppression technique will work only if the echo is relatively small. In cases where the echo is large, a supplementary echo canceller may be required. If the suppression technique described above is being used in a hands-free communication system (e.g., a speaker phone) suppression towards the hands-free user will probably not be as useful as in the other direction. In such cases, it would be more important to reduce loop-gain to suppress echo towards the hands-free user. As a result, it is more useful in that path to add switched loss when an utterance is not being received than to introduce dynamic suppression.

Figure 24:
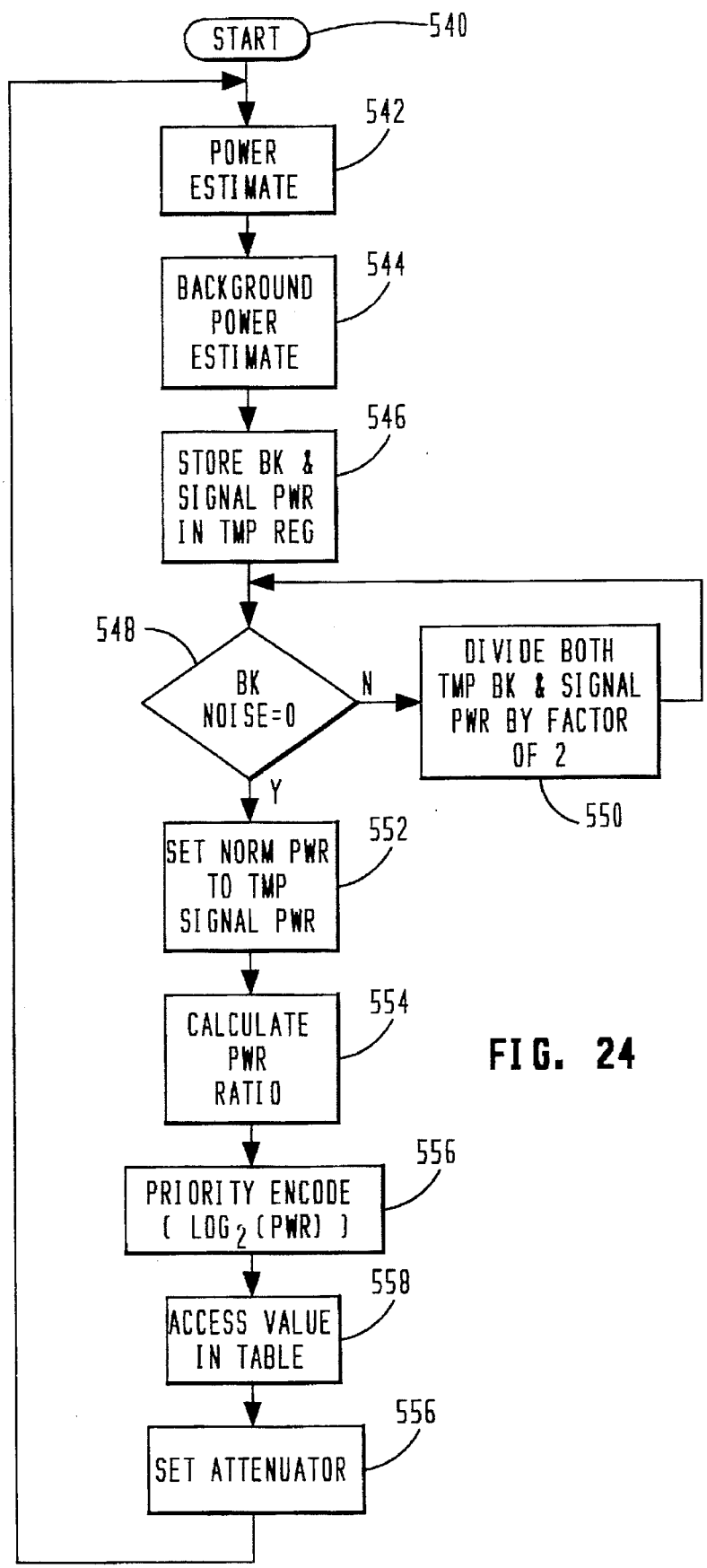
FIG. 24 illustrates a flowchart for the operation of FIG. 20.

Referring now to FIG. 24, there is illustrated a flowchart for the operation of the structure of FIG. 20. A flowchart is initiated at a start block 540 and then proceeds to a function block 542 wherein the power estimate is performed with the IIR filter. The program then flows to a function block 544 to perform the background power estimate, as described above with respect to FIGS. 2 and 3 et seq. The program then flows to a function block 546 to store the background power estimate and the signal power estimate in a temporary register. The program then flows to a decision block 548 to determine if the background noise is equal to the value of zero. If not, the program flows along an "N" block path to a function block 550. Function block 550 is the operation wherein both the signal power and the background noise power are shifted right by one, i.e., divided by two. The program then flows back to the input of the decision block 548. This shifting right by one is continued until the background noise is equal to the value of zero. At this point, the program will flow from decision block 548 along the "Y" path to a function block 552. The decision block 548 and the function block 550 perform the normalizing operation.

The function block 552 is operable to set the normalized power level to the temporary signal power stored in the temporary register, this being the value after operation thereon by the decision block 548 and the function block 550. The program will then flow to a function block 554 to calculate the power ratio, as described above with respect to blocks 438 and 440 in FIG. 20. The program will then flow to a function block 556 to perform the priority encode operation, and then to a function block 558 to access the value in the table. The program will then flow to a function block 556 to set the attenuator values.

In summary, there is provided an echo suppression device utilizing a variable gain algorithm. This variable gain algorithm utilizes two variable attenuators, one in the receive path and one in the transmit path. The attenuation for each of the attenuators is an arbitrary, potentially non-linear function of signal powers (in dB) as distinguished from two-state attenuators. The present system permits more than two possible gains for each attenuator. The signal powers that are utilized in making the decision as to the attenuation levels are noise normalized. They are derived from power estimators that are time variant. More specifically, these decay constants are a function of relative signal powers (which are time variant) in the system. The time constants are changed as a function of the relative signal powers.

Although the preferred embodiment has been described in detail, it should be understood that various changes, substitutions and alterations can be made therein without departing from the spirit and scope of the invention as defined by the appended claims.

What is claimed is:

1. A variable gain echo suppressor for use with a full-duplex communication system for connecting between a far end and a near end, comprising:

a first variable attenuator disposed between the far end and the near end;

a near-end power detector for receiving the near end transmit signal and determining the power level thereof;

a near-end normalizer for normalizing the power level at the output of said near-end power detector to provide a near-end normalized power signal;

a far-end power detector for receiving the far-end transmit signal and determining the power associated therewith;

a far-end normalizer for normalizing the power level at the output of said far-end power detector to provide a far-end normalized power signal; and a controller for setting the attenuation of said first variable attenuator as a function of said near-end and far-end normalized power levels, to allow for full-duplex communication.

2. The variable gain echo suppressor of claim 1, wherein each of said near-end and far-end power detectors comprises a peak power estimator for averaging energy estimates generated over predetermined sample times, the average thereof comprising the detected power level.

3. The variable gain echo suppressor of claim 2, wherein said near-end and far-end power detectors each comprise an Infinite Impulse Response (IIR) low pass filter.

4. The variable gain echo suppressor of claim 3, wherein said IIR filter comprises a single-pole filter, and further comprising an IIR control device for changing the value of said single pole as a function of said associated near-end or far-end normalized power level.

5. The variable gain echo suppressor of claim 4, and further comprising a second variable attenuator disposed between the near-end and the far-end, said controller for setting the attenuation of each of said first and second variable attenuators as a function of said near-end and far-end normalized power levels.

6. The variable gain echo suppressor of claim 4, wherein there are first and second pole values, said first pole value associated with a fast response and said second pole value associated with a slower response, said IIR control selecting said first pole value when said first variable attenuator is to be set at a low attenuation value, and selecting said second pole value when said attenuator value for said first variable attenuator is to be set at a mid-to-high attenuation value.

7. The variable gain echo suppressor of claim 1, wherein said near-end and far-end normalizers are each operable to normalize the output of said associated near-end and far-end power detector to the associated background noise.

8. The variable gain echo suppressor of claim 1, wherein said controller includes a far-end ratio device for detecting the ratio of said far-end normalized power signal to said near-end normalized power signal, and said far-end ratio device determining the attenuation value of said first variable attenuator.

9. The variable gain echo suppressor of claim 8, wherein said far-end ratio values have a range of values, with said range of values corresponding to predetermined scaling factors, said predetermined scaling factors for said far-end ratio values stored in a far-end table and said controller operable to access the associated far-end scaling factors for defining the attenuation operation of said first variable attenuator.

10. The variable gain echo suppressor of claim 1, and further comprising:

a white noise generator for generating white noise;

a first variable white noise attenuator for receiving on the input thereof the output of said white noise generator;

a first summation device associated with said first variable attenuator and with said first variable white noise attenuator for summing the output of said first variable attenuator with said first variable white noise attenuator; and a control circuit for setting the attenuation of said first variable white noise attenuator to reduce the amount of attenuation thereof by an amount corresponding to the increase in attenuation in said first variable attenuator and to increase the attenuation thereof by an amount corresponding to a decrease in attenuation in said first variable attenuator.

11. A variable gain echo suppressor for use with a full-duplex communication system for connecting between a far-end and a near-end, comprising:

a first variable attenuator disposed between the far-end and the near-end;

a near-end power detector for receiving the near-end transmit signal and determining the power level thereof, and having a predetermined response in the time domain, which response is variable;

a far-end power detector for receiving the far-end transmit signal and determining the power associated therewith, and having a predetermined response in the time domain, which response is variable;

a controller for setting the attenuation of said first variable attenuator as a function of said near-end and far-end detected power levels, to allow for full-duplex communication; and a response control device that is operable to vary the response of said near-end and far-end power detectors as a function of the attenuation value of said first variable attenuator, such that said far-end power detector has a fast response for high attenuation values and a slow response for low attenuation values.

12. The variable gain echo suppressor of claim 11, wherein each of said near-end and far-end power detectors comprises a peak power estimator for averaging energy estimates generated over predetermined sample times, the average thereof comprising the detected power level.

13. The variable gain echo suppressor of claim 12, wherein said near-end and far-end power detectors each comprise an Infinite Impulse Response (IIR) low pass filter.

14. The variable gain echo suppressor of claim 13, wherein said IIR filter comprises a single-pole filter, said response control device comprising an IIR control device for changing the value of said single pole as a function of said associated or far-end detected power level.

15. The variable gain echo suppressor of claim 14, and further comprising a second variable attenuator disposed between the near-end and the far-end, said controller for setting the attenuation of each of said first and second variable attenuators as a function of said near-end and far-end normalized power levels.

16. The variable gain echo suppressor of claim 14, wherein there are first and second pole values, said first pole value associated with a fast response and said second pole value associated with a slower response, said IIR control selecting said first pole value when said first variable attenuator is to be set at a mid-to-high attenuation value, and selecting said second pole value when said attenuator value for said first variable attenuator is to be set at a low attenuation value.

17. The variable gain echo suppressor of claim 12, wherein the output of said far-end and near-end power detectors are normalized to the associated background noise to provide near-end and far-end normalized power signals, said normalized power signals utilized by said controller.

18. The variable gain echo suppressor of claim 17, wherein said controller includes a far-end ratio device for detecting the ratio of said far-end normalized power signal to said near-end normalized power signal, and said far-end ratio device determining the attenuation value of said first variable attenuator.

19. The variable gain echo suppressor of claim 18, wherein said far-end ratio values have a range of values, with said range of values corresponding to predetermined scaling factors, said predetermined scaling factors for said far-end ratio values stored in a far-end table and said controller operable to access the associated far-end scaling factors for defining the attenuation operation of said first variable attenuator.

20. The variable gain echo suppressor of claim 11, and further comprising:

a white noise generator for generating white noise;

a first variable white noise attenuator for receiving on the input thereof the output of said white noise generator;

a first summation device associated with said first variable attenuator and with said first variable white noise attenuator for summing the output of said first variable attenuator with said first variable white noise attenuator; and a control circuit for setting the attenuation of said first variable white noise attenuator to reduce the amount of attenuation thereof by an amount corresponding to the increase in attenuation in said first variable attenuator and to increase the attenuation thereof by an amount corresponding to a decrease in attenuation in said first variable attenuator.

* * * * *